United States Patent
Puryk et al.

(10) Patent No.: US 11,659,788 B2
(45) Date of Patent: May 30, 2023

(54) VEHICLE AUTOMATED UNLOADING

(71) Applicants: Purdue Research Foundation, West Lafayette, IN (US); Deere and Company, Moline, IL (US)

(72) Inventors: Corwin Marcus Puryk, Bettendorf, IA (US); Stephen Robert Corban, Geneseo, IL (US); Ryan Robert White, Polk City, IA (US); Gregory Matthew Shaver, Lafayette, IN (US); Shveta Vinayak Dhamankar, West Lafayette, IN (US); John Thomas Evans, West Lafayette, IN (US); Ziping Liu, West Lafayette, IN (US); Chufan Jiang, Lafayette, IN (US)

(73) Assignee: DEERE & COMPANY, Moline, IL (US)

( * ) Notice: Subject to any disclaimer, the term of this patent is extended or adjusted under 35 U.S.C. 154(b) by 16 days.

(21) Appl. No.: 17/114,971

(22) Filed: Dec. 8, 2020

(65) Prior Publication Data
US 2021/0195840 A1    Jul. 1, 2021

Related U.S. Application Data

(60) Provisional application No. 62/956,013, filed on Dec. 31, 2019.

(51) Int. Cl.
*A01D 90/10* (2006.01)
*B65G 67/24* (2006.01)
*A01D 43/073* (2006.01)

(52) U.S. Cl.
CPC ........... *A01D 90/10* (2013.01); *A01D 43/073* (2013.01); *B65G 67/24* (2013.01)

(58) Field of Classification Search
CPC ..... A01D 43/087; A01D 90/10; A01D 43/073
See application file for complete search history.

(56) References Cited

U.S. PATENT DOCUMENTS

| | | | |
|---|---|---|---|
| 8,060,283 B2 | 11/2011 | Mott et al. | |
| 8,234,047 B2 | 7/2012 | Madsen et al. | |
| 8,428,829 B2 | 4/2013 | Brunnert et al. | |
| 8,781,692 B2 | 7/2014 | Kormann | |
| 8,868,304 B2 | 10/2014 | Bonefas | |
| 9,119,342 B2 | 9/2015 | Bonefas | |

(Continued)

FOREIGN PATENT DOCUMENTS

| | | |
|---|---|---|
| EP | 2138027 A1 | 12/2009 |
| EP | 3300582 A1 | 4/2018 |
| EP | 3448144 | 2/2020 |

*Primary Examiner* — Kaitlin S Joerger
(74) *Attorney, Agent, or Firm* — Taft Stettinius & Hollister LLP; Stephen F. Rost

(57) ABSTRACT

A vehicle automated unloading system may include a fill model and an unloading controller. The fill model is a model of a fill characteristic of a container as a function of variables comprising material unloading times, material unloading rates and material unloading locations. The unloading controller is to (a) determine a current model-based fill characteristic of the container using the dynamic fill model and (b) output control signals to adjust at least one of a material unloading time, a material unloading rate and a material unloading location based upon the current model-based fill characteristic of the container.

19 Claims, 21 Drawing Sheets

(56) References Cited

U.S. PATENT DOCUMENTS

| | | |
|---|---|---|
| 9,392,746 B2* | 7/2016 | Darr .................... A01D 43/087 |
| 9,415,953 B2 | 8/2016 | Bonefas |
| 9,457,971 B2 | 10/2016 | Bonefas |
| 9,463,939 B2 | 10/2016 | Bonefas |
| 9,511,958 B2 | 12/2016 | Bonefas |
| 9,522,791 B2 | 12/2016 | Bonefas |
| 9,522,792 B2 | 12/2016 | Bonefas |
| 9,642,305 B2 | 5/2017 | Nykamp et al. |
| 9,702,753 B2 | 7/2017 | Johnson et al. |
| 9,861,040 B2 | 1/2018 | Bonefas |
| 10,015,928 B2 | 7/2018 | Nykamp et al. |
| 10,317,272 B2 | 6/2019 | Bhavsar et al. |
| 2011/0307149 A1* | 12/2011 | Pighi .................... A01D 43/087 700/218 |
| 2012/0263560 A1 | 10/2012 | Diekhans et al. |
| 2014/0311113 A1* | 10/2014 | Bonefas ................ A01D 75/02 56/10.2 R |
| 2014/0350801 A1* | 11/2014 | Bonefas ................ B60R 11/04 701/50 |
| 2017/0127617 A1* | 5/2017 | Hirthammer ........ A01D 43/073 |
| 2017/0206645 A1* | 7/2017 | Bonefas ................ G06T 7/0004 |
| 2018/0084708 A1 | 3/2018 | Neitemeier et al. |
| 2020/0128738 A1* | 4/2020 | Suleman ............ A01D 41/1278 |

\* cited by examiner

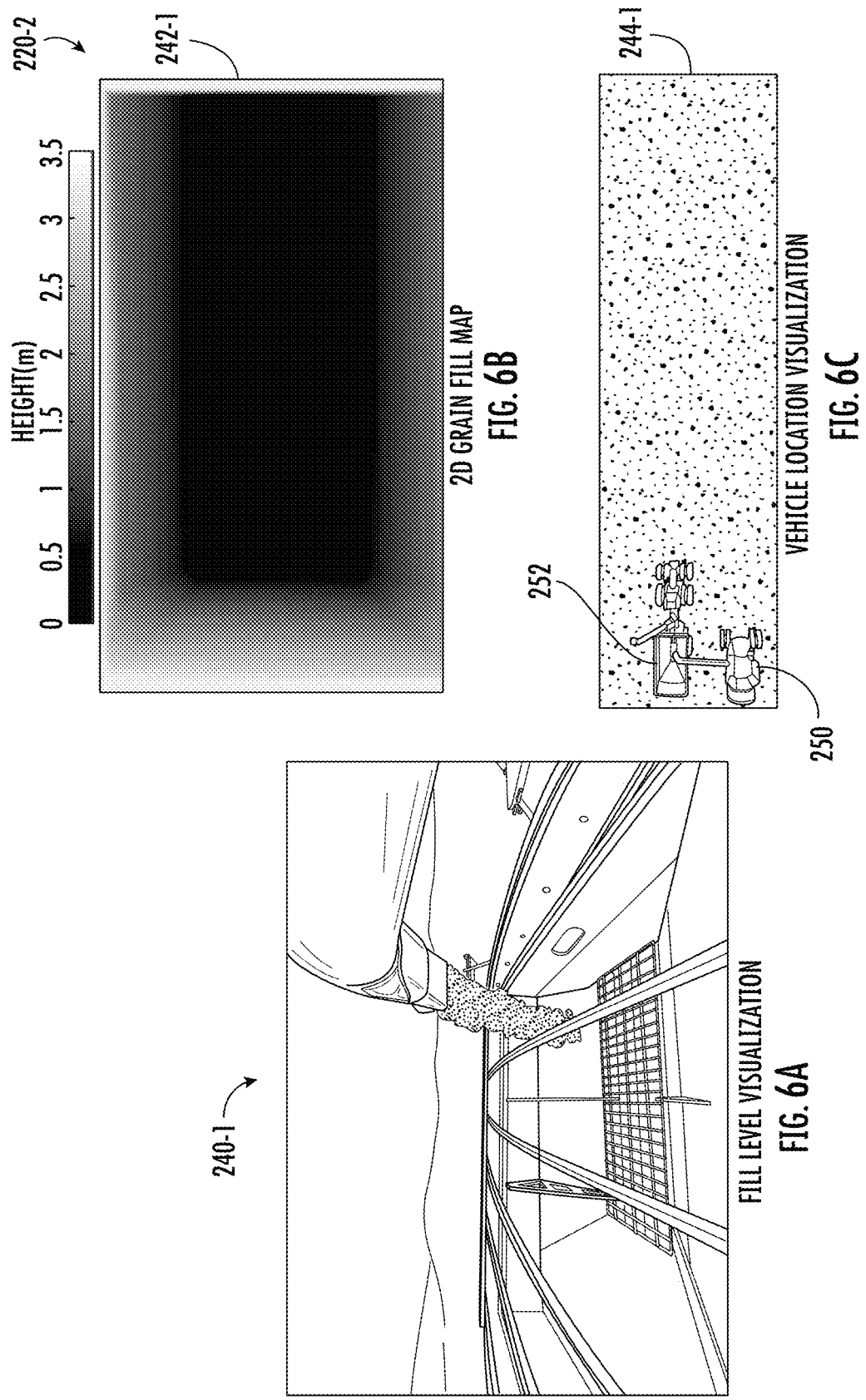

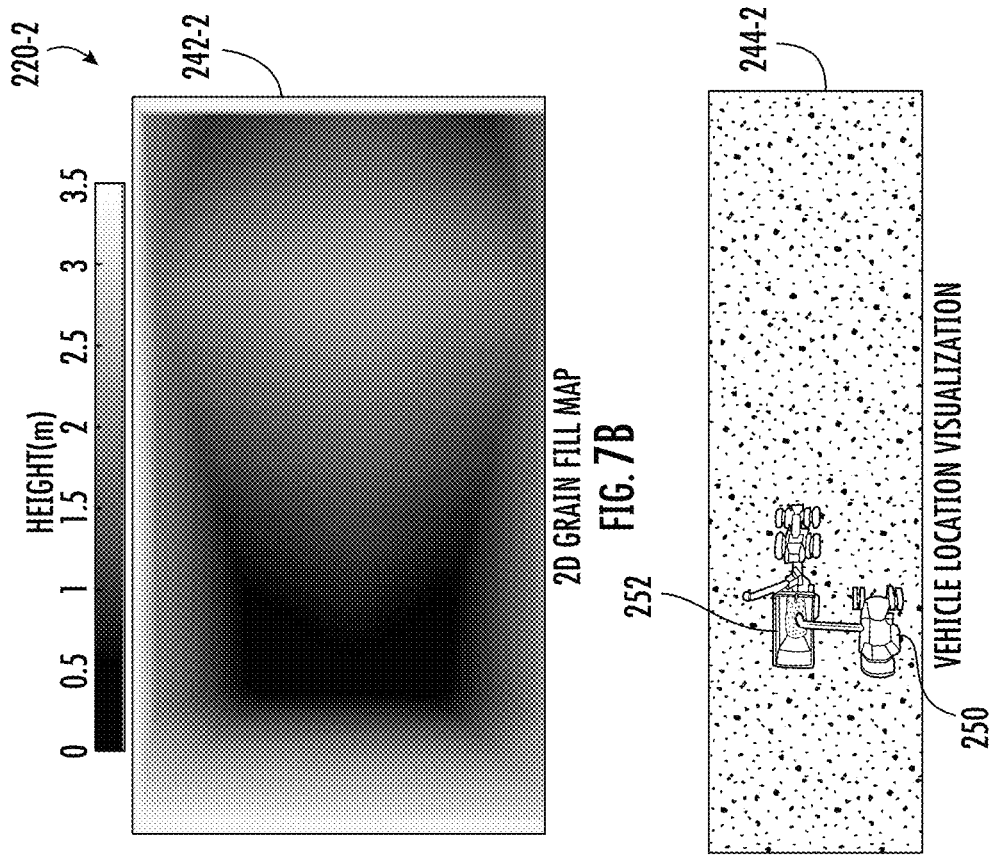
FIG. 7B 2D GRAIN FILL MAP
FIG. 7C VEHICLE LOCATION VISUALIZATION
FIG. 7A FILL LEVEL VISUALIZATION

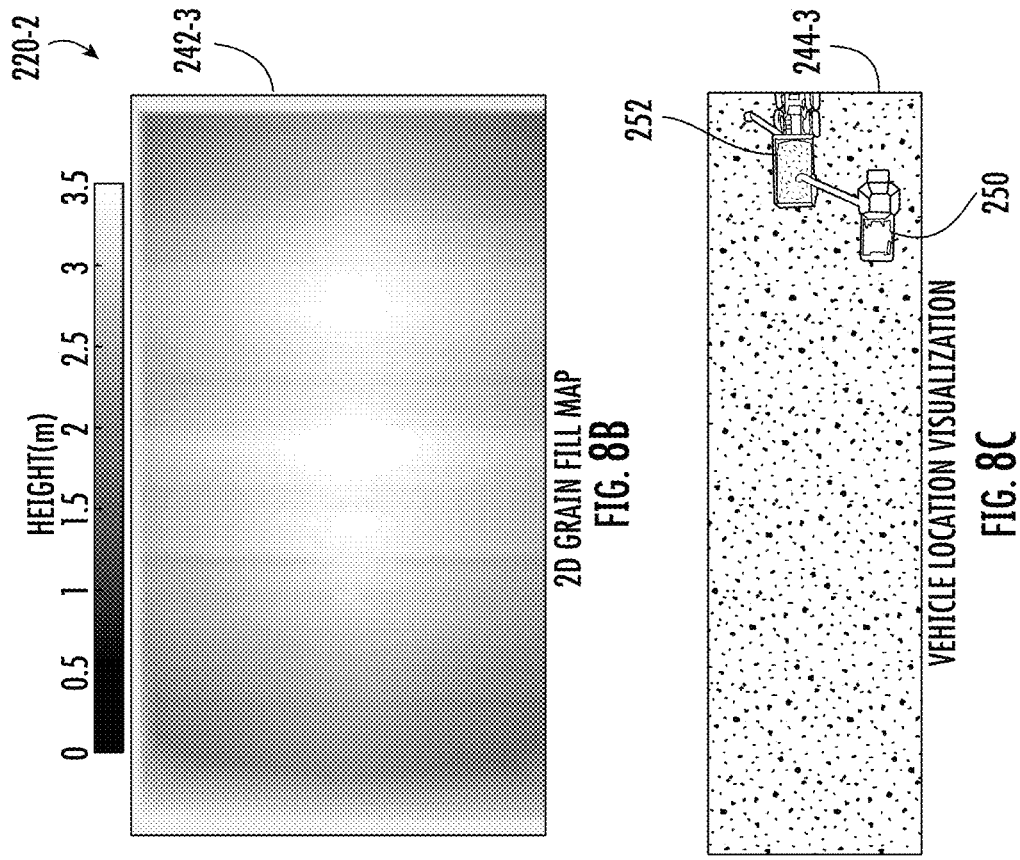
FIG. 8B 2D GRAIN FILL MAP
FIG. 8C VEHICLE LOCATION VISUALIZATION
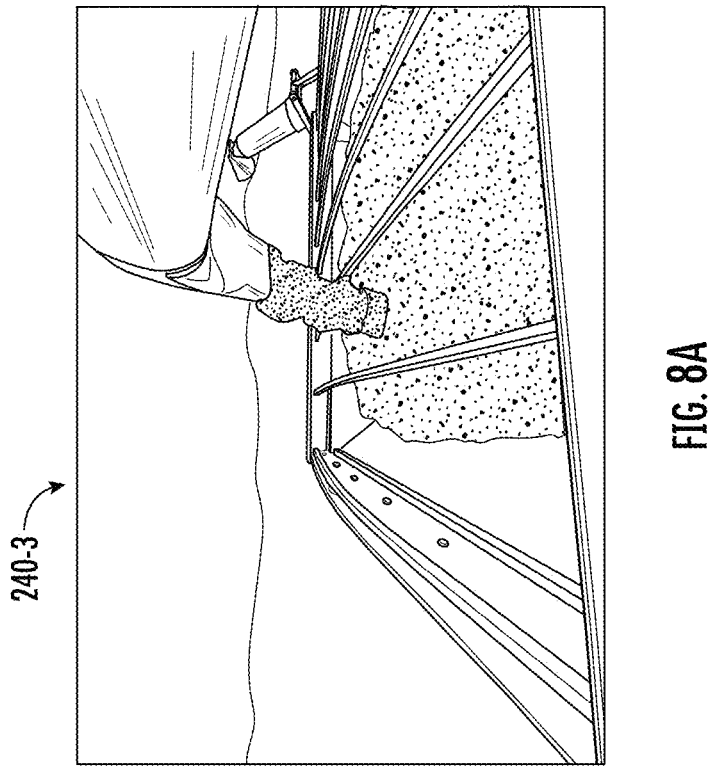
FIG. 8A

VEHICLE AUTOMATED UNLOADING

CROSS-REFERENCE TO RELATED APPLICATIONS

The present application claims priority under 35 USC 119 from U.S. Provisional Patent Application Ser. No. 62/956,013 filed on Dec. 31, 2019 by Corwin Marcus Puryk et al. and entitled VEHICLE AUTOMATED UNLOADING, the full disclosure of which is hereby incorporated by reference. The present application is related to U.S. Pat. No. 9,861,040 issued to Bonefas on Jan. 9, 2018; U.S. Pat. No. 8,060,283 issued to Mott et al. on Nov. 15, 2011; and U.S. Pat. No. 9,642,305 issued to Nykamp et al. on May 9, 2017, the full disclosures each of which are hereby incorporated by reference.

BACKGROUND

Materials being gathered and/or harvested by a gathering/harvesting vehicle are often unloaded into a container of a separate transport vehicle, allowing the gathering/harvesting vehicle to remain on site while the material is transported off-site by the transport vehicle. In many circumstances, the materials are often unloaded while the gathering/harvesting vehicle continues to gather and harvest material and while both the harvesting/gathering vehicle and the transport vehicle are moving. For example, while a harvester continues to move and harvest crop material, crop material may be unloaded from the harvester into a wagon, grain cart or other transport vehicle.

BRIEF DESCRIPTION OF THE DRAWINGS

FIG. 6A is an example captured image from a perception system during filling of an example grain cart at a first point in time.

FIG. 6B is a top view of an example fill model based upon the example captured image of FIG. 6A at the first point in time of FIG. 6A.

FIG. 6C is a top view depicting relative positions of an example harvester and the example grain cart at the first point in time of FIG. 6A.

FIG. 7A is an example captured image from a perception system during filling of the example grain cart at a second point in time.

FIG. 7B is a top view of an example fill model based upon the example captured image of FIG. 7A at the second point in time of FIG. 7A.

FIG. 7C is a top view depicting relative positions of an example harvester and the example grain cart at the second point in time of FIG. 7A.

FIG. 8A is an example captured image from a perception system during filling of the example grain cart at a third point in time.

FIG. 8B is a top view of an example fill model based upon the example captured image of FIG. 8A at the third point in time of FIG. 8A.

FIG. 8C is a top view depicting relative positions of an example harvester and the example grain cart at the third point in time of FIG. 8A.

Figure 1:
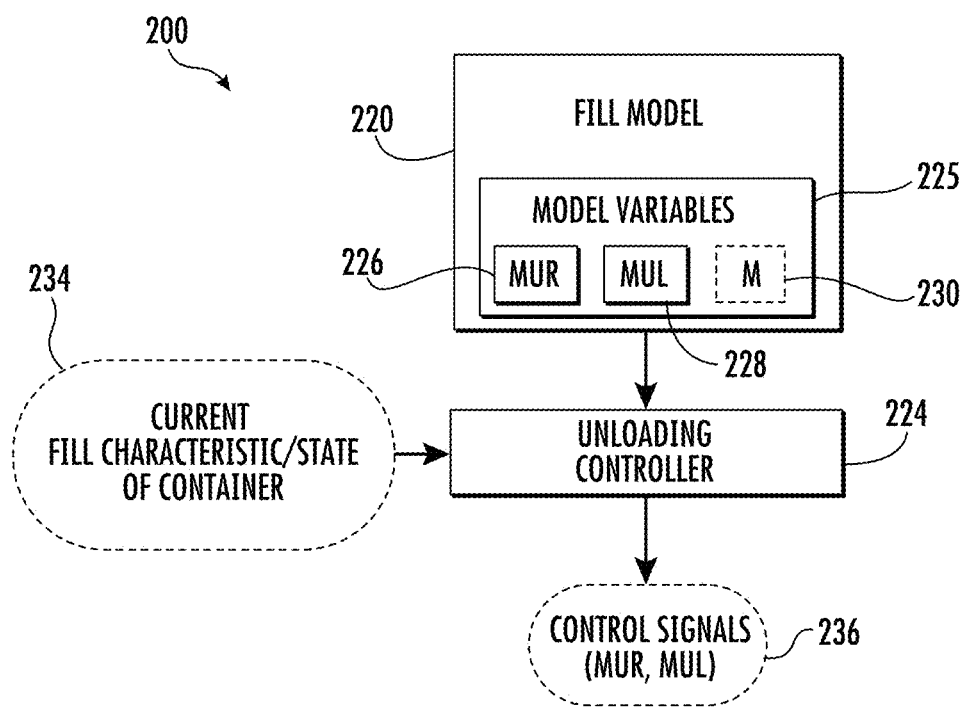
FIG. 1 is a block diagram schematically illustrating portions of an example vehicle automated unloading system.

Throughout the drawings, identical reference numbers designate similar, but not necessarily identical, elements. The FIGS. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

The unloading of crop material into the container of a transport vehicle presents many challenges for an operator. As result, many aspects of such unloading may be automated. Disclosed are systems and methods that facilitate the automated unloading of material, such as crop material, into a container of a transport vehicle. The disclosed systems and methods utilize a fill model that models, estimates and predicts a fill characteristic of the container, such as a fill profile of the container, based upon several variables such as material unloading times, corresponding material unloading rates (zero and non-zero "rates") and corresponding material unloading locations. In some implementations, the model may be based upon additional variables such as the moisture content of the materials being unloaded, the particular type of material being unloaded and/or vibration experienced by the container. The disclosed systems and methods may utilize the fill model to determine a current fill characteristic or state (fill profile) of the container and/or adjust any current unloading parameters based upon the current fill characteristic or state.

For purposes of this disclosure, a "container" refers to any volume which may receive and hold the material being unloaded. The "container" may be carried, pushed or pulled. For example, a "container" may refer to the interior of a wagon or cart being pulled by a self-propelled vehicle such as a tractor or truck. A container may refer to the interior of a semi-truck trailer or the like.

In some implementations, different containers may have different associated fill models. In some implementations, systems and methods may sense or otherwise detect an identity or characteristics of the container, wherein a fill model corresponding to the identity or characteristic of the container is obtained and utilized to control unloading of material into the container. In some implementations, a local or remote operator may input the identity or characteristics of the container. In some implementations, a perception system using sensors, such as cameras, may sense the actual configuration of the container into which the material is being unloaded.

In some implementations, different fill models may be associated with other variables. For example, different fill models may be associated with different materials being unloaded. A first fill model may be associated with a first type of grain while a second fill model is associate with a second type of grain. A third fill of model may be associated with the first type of soil while a fourth fill model is associated with a second type of soil.

In some implementations, different fill models may be associated with different material moisture levels. For example, a first fill model may be associated with material having moisture value within a first range of moisture values while a second fill model may be associated with a material having a moisture value within a second different range of moisture values. In each of such implementations, a controller may retrieve the appropriate fill model based upon the corresponding variables. In yet other implementations, a single fill model may incorporate such variables. For example, a single model may comprise the material type and/or moisture variables, wherein multiple material types and/or multiple moisture values form the single model and serve as inputs to the single model.

Throughout the disclosure, the fill model may be described as being based upon variables comprising material unloading times, material unloading rates and material unloading locations. A "material unloading time" (MUT) may refer to the duration and/or the timing at which material is unloaded. The timing of material unloading may be the individual starting and stop times with respect to real-world time or the time at which unloading into the container is begun. Each of such variables may be independently changed. Different periods of time during which material is unloaded in the container may be associated with the same unloading rate and the same unloading location or may be associated with different loading rates and/or different unloading locations. For example, during a first period of time, material may be unloaded at a first rate at a first location. During a second period of time, material may be unloaded at a second different rate at the first location. During a third period of time, material may be unloaded at a third different rate at a second different location. In some circumstances, the material unloading times, material unloading rates and material unloading locations may refer to a single period of time, a single constant material unloading rate and/or a single unloading location.

A material unloading rate (MUR) may refer to the rate at which the material is unloaded or discharged into the container. This may be adjusted by controlling the rate at which a belt, conveyor, auger or other component conveys or otherwise moves the material from a gathering/harvesting vehicle into the container of a transport vehicle. A MUR may be a zero rate, an "off" unloading state, such was when the unloading drive is disengaged, or one of many different possible non-zero unloading rates, an "on" unloading state when the unloading drive is engaged and is unloading at a particular rate or speed. In some implementations, the MUR may be binary, either an "off" state and an "on" state. The material unloading location (MUL) relates to the location at which the material is dropped into or discharged into the container. The MUL location may be adjusted by adjusting the relative position or location of the gathering/harvesting vehicle and the transport vehicle. For example, the container carried, pulled or pushed by the transport vehicle may be moved relative to the gathering/harvesting vehicle or a spout or other discharge point of the harvesting vehicle. The entire gathering/harvesting vehicle may be moved relative to the container.

In some implementations, the MUL location may be adjusted by adjusting the relative position of a discharge point of the gathering/harvesting vehicle and the container while the relative positioning of the vehicles themselves does not change. For example, the spout of a harvester may be elevated, rotated or otherwise moved relative to the remainder of the gathering/harvesting vehicle and relative to the container of the transport vehicle.

Disclosed are example systems and methods that additionally offer the option of determining the current fill characteristic or state of the container and/or adjusting the MUT, the MUR and/or the MUL using a perception system. The perception system may utilize sensors that output perception data or perception signals representing at least one actual fill characteristic or state of the container. A fill characteristic may refer to a fill profile of the container, the distance separating a peak of material from the edge of the container or the like. Examples of sensor that may be utilized as part of the perception system include, but are not limited to, cameras, lidar, radar, ultrasonic sensors and the like. The perception signals produced by such perception systems may be signals that represent images or signals that represent point clouds.

In one example implementation, a gathering/harvesting vehicle, such as a harvester may include multiple cameras that are supported so as to capture images of the container itself, including its interior which may be filled with crop material. Such cameras may additionally be supported so as to capture images of the spout or other discharge point of the gathering/harvesting vehicle. The perception signals are in the form of signals that represent the image that was captured. An unloading controller may analyze the captured images (perception signals) to determine the current fill state of the container during unloading of material from the gathering/harvesting vehicle into the container.

In one example implementation, a propulsion portion of a receiving vehicle, such as a tractor or other vehicle, may include multiple cameras that are supported so as to capture images of the container itself, including its interior which may be filled with crop material. Such cameras may additionally be supported so as to capture images of the spout or other discharge point of the gathering/harvesting vehicle. The perception signals are in the form of signals that represent the image that was captured. An unloading controller may analyze the captured images (perception signals) to determine the current fill state of the container during unloading of material from the gathering/harvesting vehicle into the container.

In some implementations, the disclosed systems and methods may switch between use of the fill model and use of the perception system when determining the current fill state or characteristic of the container and/or determining how to adjust the ongoing MUR and/or MUL. In some implementations, the disclosed systems and methods may receive input in the form of a selection or command from an operator, wherein the input determines whether the perception system or the fill model is used. Such an "operator" may be local, residing in the cab or other seat of either the gathering/harvesting vehicle or the transport vehicle. Such an operator may be remote, not riding either of the gathering/harvesting vehicle or the transport vehicle. For example, a remote operator may be an operator at a remote site with the operator being in wireless communication with the gathering/harvesting vehicle.

In some implementations, a local controller or a remote controller may automatically switch the system between use of the fill model and use of the perception system in response to predefined threshold or criteria being satisfied. Such switching may be automatically carried out without operator intervention. Such switching may be based upon a comparison of existing conditions to the predefined thresholds or criteria. The existing conditions may be sensed, may be input from an operator or may be cyclic, such as a time of day.

In some implementations, a local or remote controller may automatically evaluate the existing conditions with respect to predefined thresholds or criteria. In response to the predefined criteria being satisfied, the controller may output a notification to the local or remote operator, recommending that the operator initiate the switch. In some implementations, the controller may automatically carry out the switch following notification to the operator and following lapse of a predetermined amount of time during which the operator may override the forthcoming switch.

In some implementations, the disclosed systems and methods may switch between use of the perception system and the fill model based upon a performance evaluation of the perception system. For example, sensed lighting conditions, sensed airborne particulates such as dust or chaff, and/or degree of occlusion or blockage of a sensor (such as the degree of occlusion of a camera lens or the like) may serve as a basis for the controller automatically switching between use of the fill model and the perception system. In some implementations, such switching is automatic. In other implementations, the systems and methods may output a notification to the operator recommending a switch, wherein the operator may or may not enter a command initiating the switch.

In some implementations, the fill model is dynamically adjusted or updated using the perception data acquired by the perception system. For example, during those times at which the performance evaluation of the perception system is above a predefined quality threshold, the perceived fill characteristic or state of the container may be compared to the same fill characteristic or state estimated or predicted based upon the existing stored fill model (the model-based fill characteristic or fill state). In circumstances where the actual fill character interesting or state as determined from the perceived data is not equal to or is sufficiently different from the corresponding model-based fill characteristic or fill state, the disclosed systems and methods may adjust or alter the existing fill model using the most recent perceived data. As a result, the fill model may be updated so as be more accurate for when the fill model is used in place of the perception system to estimate the current fill state or characteristic of the container and/or to adjust ongoing unloading parameters such as MUR and MUL.

In some implementations, the configuration of the container being filled may be dynamically adjusted or updated using the perception data acquired by the perception system. For example, the perception system may sense the depth, outer perimeter or volume of the container into which material is being unloaded. In one implementation, cameras may be used to capture the configuration of the container being filled. In some implementations, cameras or other sensors may be used to sense a barcode identifier or other identifier on the container. In some implementations, such sensors may sense an RFID tag carried by the container. Use of the perception system to sense and determine the actual configuration or identity of the container may assist in ensuring that the proper fill model is employed or that the results determine from the fill model are accurate.

FIG. 1 is a block diagram schematically illustrating portions of a vehicle automated unloading system 200 for providing an autonomous or semi-autonomous unloading of material from a gathering/harvesting vehicle (sometimes referred to as a transferring vehicle or lead vehicle), such as a harvester, into a container of a transport vehicle. System 200 comprises fill model 220 and unloading controller 224.

Fill model 220 comprises a system model of a fill profile for a material filling a container of a transport vehicle. The model estimates or predicts what regions of the interior of the container will be filled with material for a given set of values for various fill variables. Fill model 220 may estimate or predict what regions of the interior the container will be filled with material at a given point in time based upon a given set of values for the various fill variables. Fill model 220 may estimate or predict how a mound of material presently being formed within the container will grow or shift in response to the addition of material and/or the mound abutting interior surfaces or edges of the container. For example, the shape of a growing mound of material within the container may change as sides of the mound shift or cascade in response to the impact of additional material or in response to the material the mound encountering an edge or interior of the container. Such cascading may vary depending upon where on the mound the material falls as determined by the material unloading location (the angle of the spout, the location of the spout and/or the height of the spout above the mound), the density of the material being unloaded and the stickiness of the material being unloaded (which may be depend upon the moisture content of material), the characteristics of the individual particles of the material (which may depend upon the type of material being deposited) and any settling of the material. Such settling may be based upon a degree of vibration experienced by the container. Fill model 220 may predict the angle of repose of such a mound of material following the addition of material and taking account any shifting or cascading of the material. Fill model 220 may predict a shift in material of the mound that results in material spilling from the container. Fill model 220 may predict the amount of material spilling from a container.

Fill model 220 may be used to estimate or predict what regions of the interior of the container are filled with material for a given set of historical values for various fill variables. Likewise, fill model 220 may be used to estimate or predict what regions of the interior of the container will be filled with material in the future for various possible values for the fill variables, given the current fill state of the container. In such circumstances, fill model 220 may be used to select values for the variables to achieve a desired or target fill profile for the container. For example, a target or fill profile may be a profile that maximizes use of the storage capacity of the container while reduces likelihood of spillage of the material during filling or subsequent transport.

As schematically shown by FIG. 1, fill model 220 may be based upon multiple model variables 225 such as MUT 225, MUR 226 and MUL 228. As shown in broken lines, fill model 220 may be based on additional variables such as the moisture content (M) 230 of the material being unloaded into the container or such as material type (MT) 132. In some implementations, fill model 220 may be additionally based upon variables such as the intensity, duration and timing of vibration experienced by the material within the container. Fill model 220 may be empirically generated by gathering actual perceived fill states or characteristics of a particular container and also gathering the associated values for the various model variables 225 over time.

In some implementations, fill model 220 may be based upon other variables provided by multiple data streams. For example, data streams from the transport vehicle, such as a tractor and pulled cart and data streams from the gathering/harvesting vehicle may be utilized to form the fill model. Examples of data streams from the transport vehicle include, but not limited to, position data, velocity and heading data, engine load data (to estimate the cart fill level prior to and unload cycle), tractor ID, and connected cart dimensions (at initial setup) may serve to form fill model 220 and to use the fill model 220. Data streams from the gathering/harvesting vehicle, such as the combine harvester) include, are not limited to composition data, velocity and heading data, grain tank fill level, unloading auger status (on/off), material type (such as grain type), material moisture level and a container cart fill perception system correction factor.

In some implementations, the system model or fill model 220 may be generated using various data values for various unloading parameters that are gathered as grain harvested by a harvesting and unloaded into a grain cart being pulled alongside the harvester by tractor. Such collection may be carried out using information already present on the harvesting vehicle controller area network (CAN) and navigation buses such as grain properties, unloader status, geospatial information, a Kvaser air bridge that wirelessly transmits data tractor and cart configuration identification and load information from the tractor's CAN to the logger on the harvesting vehicle and cameras that capture images of the grain cart during filling. Fill model 220 may be stored in a persistent storage device for access by unloading controller 224.

In one example implementation, fill model 220 determines the fill profile and the spillage from container based on the historical material unloading rate, historical material unloading location, container geometry, material property, and historical fill profile. The fill model 220 updates the fill profile from one historical fill profile, which is the initial condition. The fill profile estimates the material distribution in the container based on the constant angle of repose, which is a physical property of the material. Container geometry is used as the boundary condition for the grain fill model to constrain the fill distribution and determine material spillage from the container. A smooth filter is applied to the fill profile to simulate the effect of vibration and ensure the continuity of the fill profile.

Figure 2B:
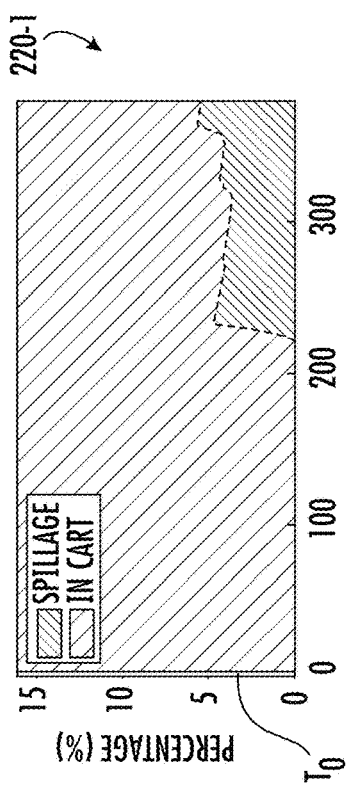
FIG. 2B is graph illustrating fill and spillage percentages at the first point in time with respect to the fill model of FIG. 2A.
Figure 2C:
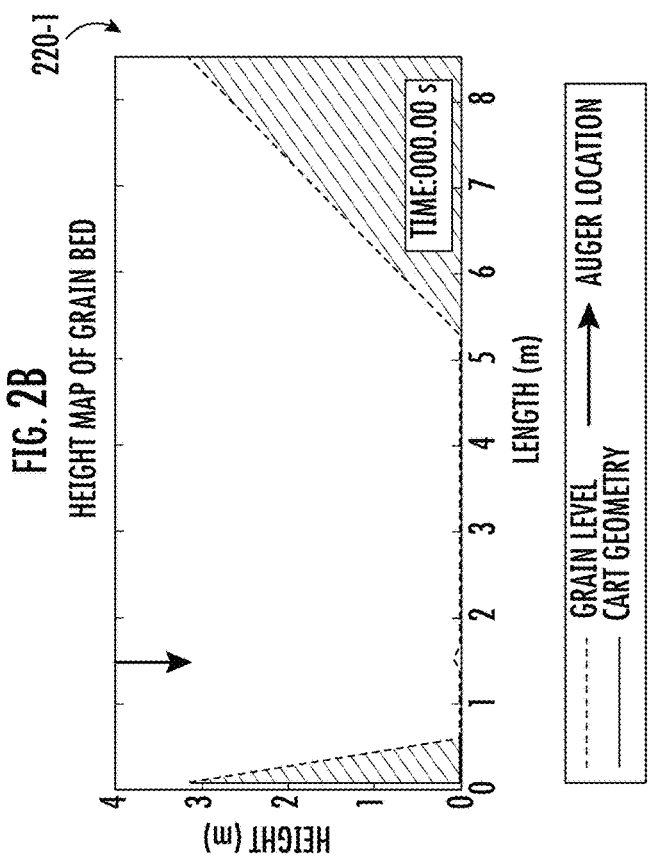
FIG. 2C is an example fill cross sectional height map of an example grain bed of an example cart geometry with an auger location at the first point in time.
Figure 2A:
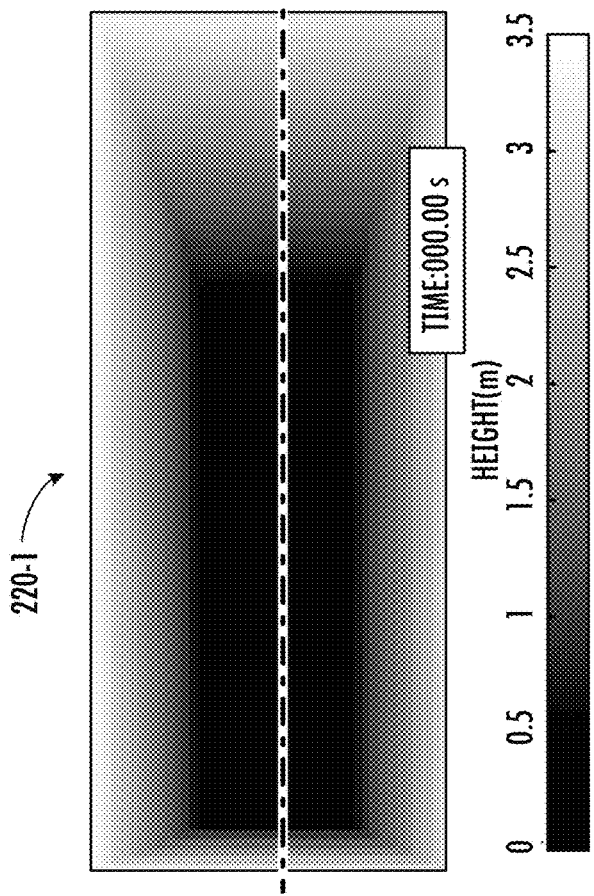
FIG. 2A is the top view of example fill model in operation at a first point in time.
Figure 3B:
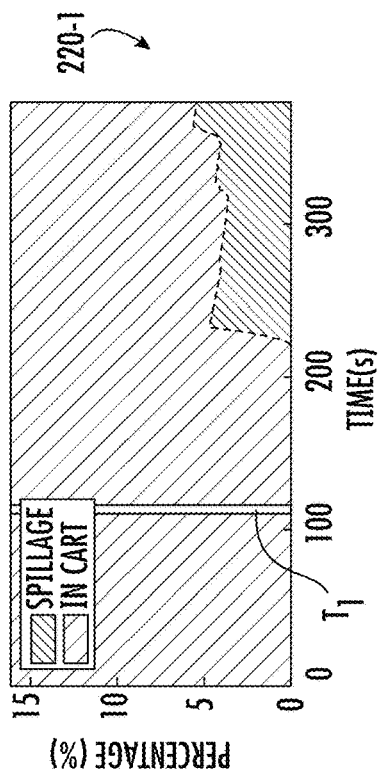
FIG. 3B is graph illustrating fill and spillage percentages at the second point in time with respect to the fill model of FIG. 2A.
Figure 3C:
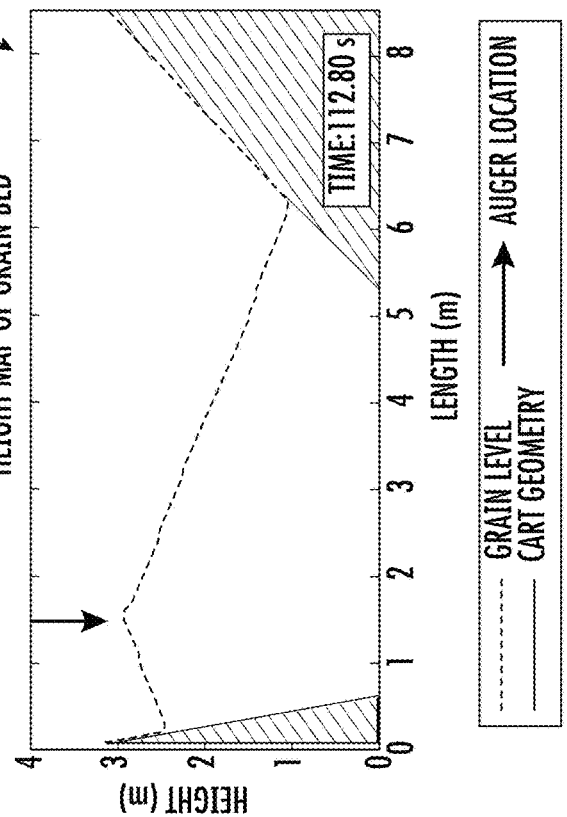
FIG. 3C is an example cross sectional fill height map of an example grain bed of an example cart geometry with an auger location at the second point in time.
Figure 3A:
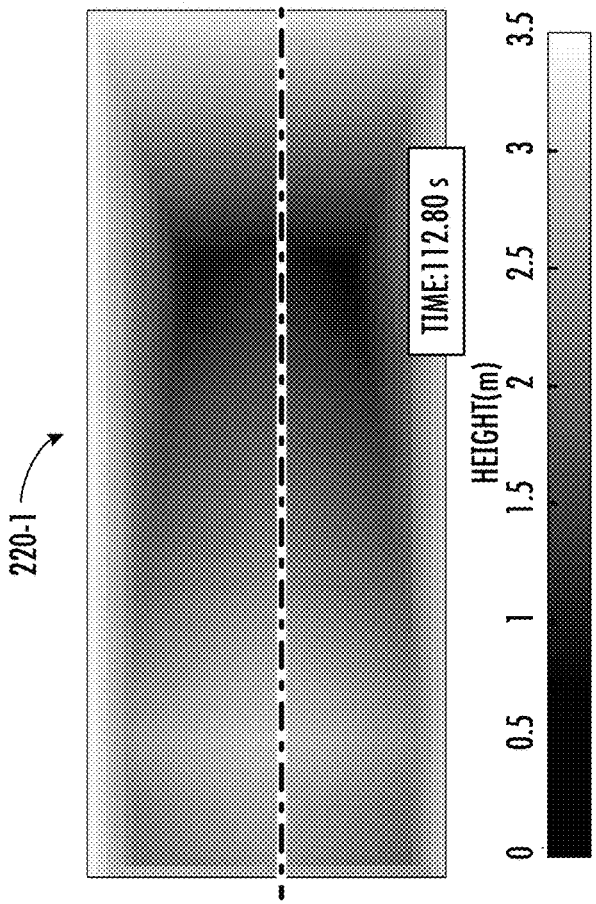
FIG. 3A illustrates the top view of the example fill model of FIG. 2A in operation at a second point in time.
Figure 4B:
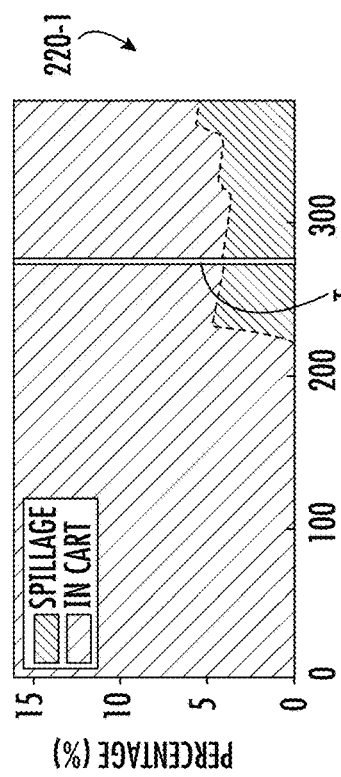
FIG. 4B is a graph illustrating fill and spillage percentages at the third point in time with respect to the fill model of FIG. 2A.
Figure 4C:
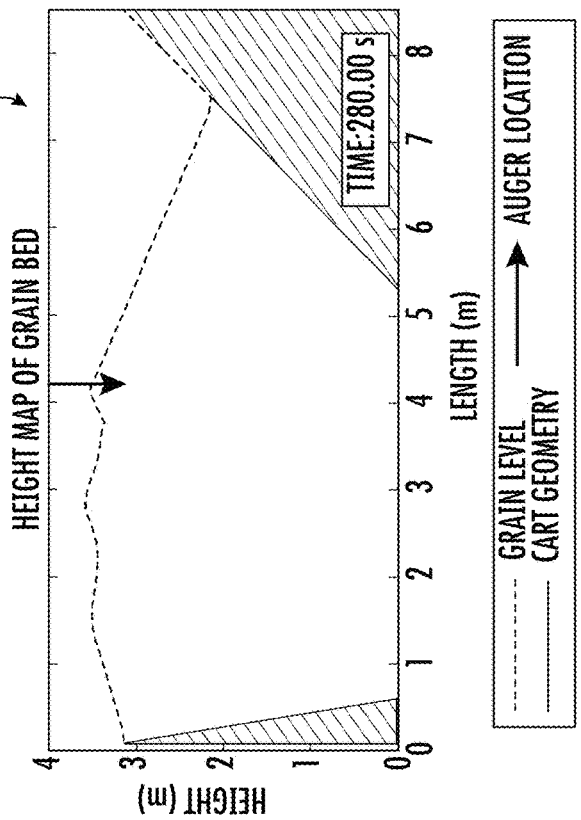
FIG. 4C is an example fill cross sectional height map of an example grain bed of an example cart geometry with an auger location at the third point in time.
Figure 4A:
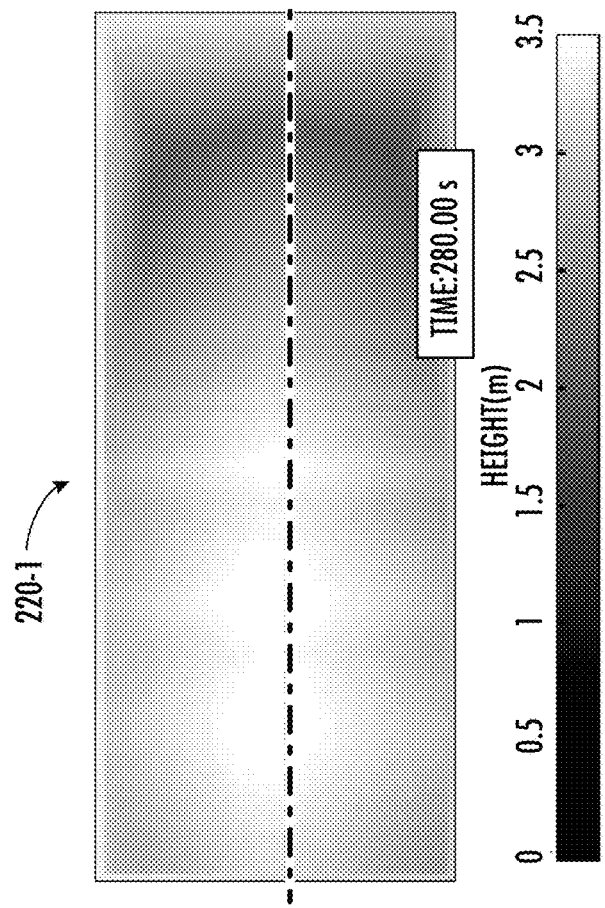
FIG. 4A illustrates the top view of the example fill model of FIG. 2A in operation at a third point in time.
Figure 5B:
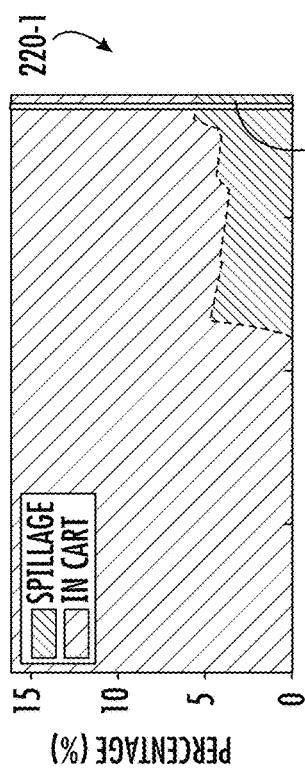
FIG. 5B is a graph illustrating fill and spillage percentages at the fourth point in time with respect to the fill model of FIG. 2A.
Figure 5C:
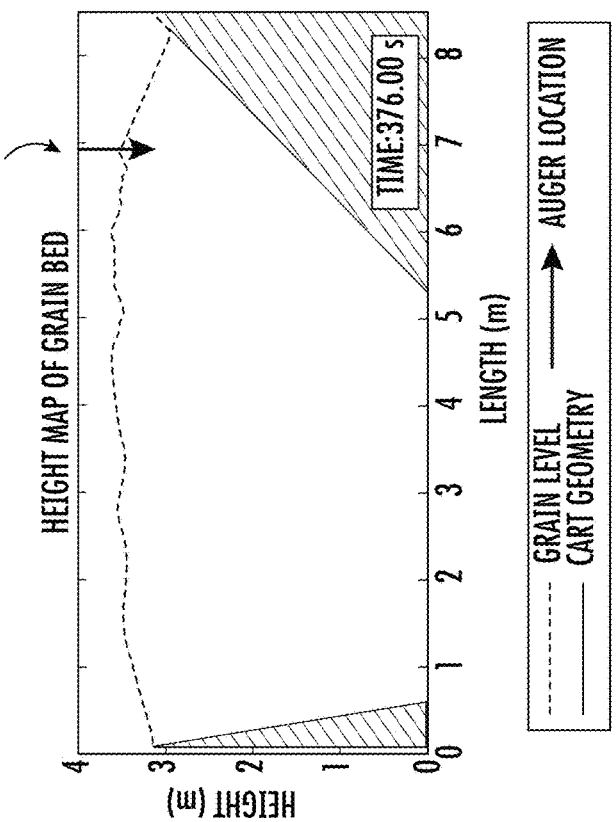
FIG. 5C is an example fill cross sectional height map of an example grain bed of an example cart geometry with an auger location at the fourth point in time.
Figure 5A:
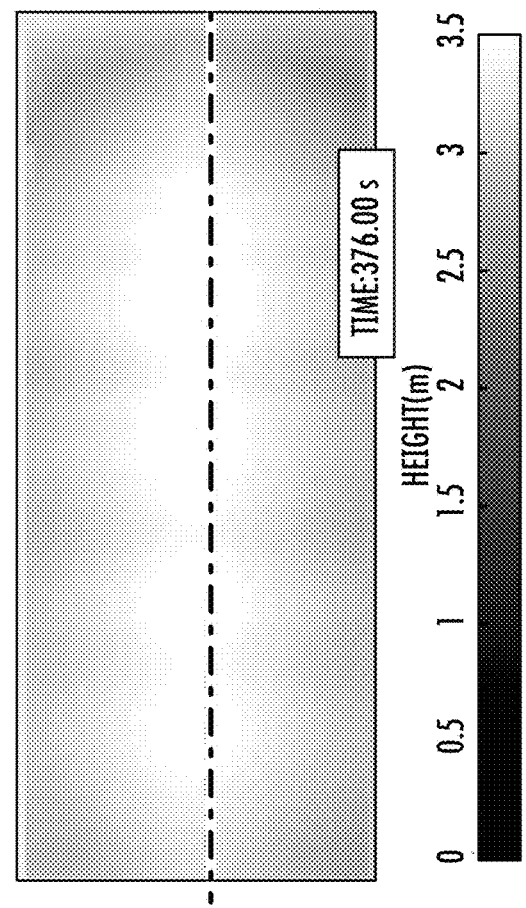
FIG. 5A illustrates the top view of the example fill model of FIG. 2A in operation at a fourth point in time.

FIGS. 2A, 2B, and 2C depict an example fill model 220-1 in operation at a first point in time. FIGS. 3A, 3B and 3C depict an example fill model in operation at a second point in time. FIGS. 4A, 4B, and 4C depict an example fill model in operation at a third point in time. FIGS. 5A, 5B, and 5C depict an example fill model in operation at a fourth point in time. The example fill model 220-1 is a model that correlates fill characteristics of a receiving container (fill height, fill percentage, fill location, spill percentage) over time as a function of varying fill rate from grain flow rate) and auger or spout location. FIGS. 2A-5A are snapshots of a top-down visualization of a fill characteristic (fill height) of the example grain receiving container or cart at different points in time based upon the model 220-1. FIGS. 2B-5B are graphs illustrating different fill percentages and spillage percentages at different times T1-T3 according to the model 220-1. FIGS. 2C-5C are snapshots of a height map of the grain bed in the example grain container cart at different points in time according to the model 220-1. The example fill model 220-1 represents various stages during the filling of a container with grain being unloaded from a harvester.

FIGS. 6A, 6B, 6C, 7A, 7B, 7C, 8A, 8B and 8C depict an example grain fill model 220-2 simulating the change in shape of the grain pile during unloading, wherein the grain fill model is based upon perception signals from a perception system. In one implementation, the grain fill model is based upon stereoscopic images of the grain within the grain cart during unloading, wherein the shape fill profile at any moment in time is linked to recorded variables of the fill model such as MUT, MUR, MUL, M and MT, recorded over time. FIGS. 6A-8A are example captured images 240-1, 240-2 and 240-3, respectively, of the example fill container or cart at different points in time. FIGS. 6B-8B are generated snapshots 242-1, 242-2 and 242-3 of model 220-2 which are based upon the corresponding captured images 240-1, 240-2 and 240-3 of FIGS. 6A-8A, respectively. FIGS. 6C-8C depict visualizations 244-1, 244-2, and 244-3, respectively, of the relative positions of the example unloading vehicle 250 (and its unloading spout) and receiving vehicle (grain cart) 252 at the different points in time at which the images were captured and portions of the model were generated.

In one example implementation, fill model 220 estimates the fill profile change in each single time step. By stacking the change in each time step, the model can estimate the profile change from the initial fill profile to the current profile. For each time step, the fill model updates the fill profile based on the fill profile from the last step, the volume of material unloaded in this step, material unloading location, container geometry, and material property. The estimation in each time step consists of the following procedure.

1. According to the fill profile in the last time step and the material unloading location, calculate the accumulation region in the container where the new material will be accumulated. Such accumulation region is bounded by the fill profile valley around the unloading location.

2. Update the fill profile by distributing the new material in the current time step in the accumulation region based on the constraint that the fill distribution should have a constant angle of repose.

3. Compare the updated fill profile with the container geometry to determine if there is any spillage from the container boundary. If there is spillage, remove the excess material from the profile and record the spillage 4. Apply a smooth filter on the updated fill profile to improve the continuity of the fill profile and simulate the effect of vibration.

Unloading controller 224 controls at least one aspect regarding the unloading of material from the gathering/harvesting vehicle into the container of the transport vehicle. Unloading controller 224 stores values for the model variables 225 over time during the filling of the container. For example, unloading controller 224 may receive signals from various sensors, wherein the signals, alone or in combination, directly or indirectly indicate values for the various variables 225 of the fill model. Various sensors, such as cameras, switches and the like, may indicate the MUT, the times at which unloading occurred in time to which unloading did not occur. Various sensors, such as cameras, may indicate the MUR, the rate at which the auger was driven, the amount of material carried per unit time by the auger or changes thereto over time. Various sensors, such as cameras, contact switches, potentiometers and the like, may indicate the MUL such as the angle of the unloading spout, its height, and its relative location to the container during unloading or changes thereto over time. Various sensors, such as moisture sensors, may indicate the moisture of the material being unloaded or changes thereto over time. Various sensors may indicate the type of material being unloaded, the density of the material being unloaded or the like. Various sensors, such as vibration sensors, may indicate the intensity, duration and timing of her vibration experienced by the materials within the container. In some circumstances some of the values for the different variables may be set by controller, wherein said values would be determined. For example, a controller which initiates unloading or pauses unloading would have such starting and stopping times. In some circumstances, some of the values for the different variables may be determined and input by an operator. Each such values for the variables and changes to the variables over time may be stored for subsequent use in determining a current fill characteristic of the container.

Using such stored values and fill model 220, unloading controller 224 may determine the current fill characteristic/state of container as indicated by broken lines 234. As further indicated by broken lines, based upon the current fill characteristic/state of container, a target fill profile for the container, and fill model 220, unloading controller 224 determines and outputs control signals 36 to adjust at least one of the MUT(s), the MUR(s) and the MUL(s). This process may be repeated multiple times as a container is filled during unloading to achieve the target fill profile for the container.

In some implementations, rather than determining the current fill state of the container using fill model 220 and historic stored values for the model variables 225, unloading controller 224 may obtain the current fill state for the container using perception data received from a perception system. However, when determining how to adjust various unloading parameters going forward, unloading controller 224 may utilize fill model 220 to determine the various values for the model variables 225 so as to achieve the target fill profile for the container. Such control over unloading may occur in circumstances where the perception system is available to determine the current fill state of the container but where the perception system later becomes unavailable to provide closed-loop feedback control over the fill profile of the container.

Figure 9:
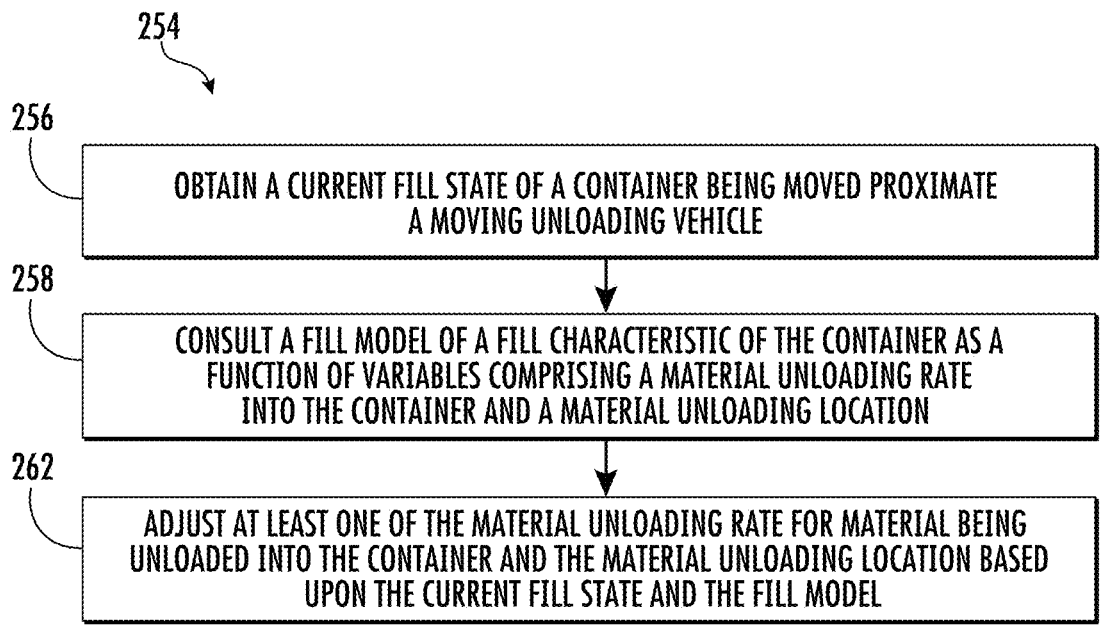
FIG. 9 is a flow diagram of an example vehicle automated unloading method.

FIG. 9 is a flow diagram of an example vehicle automated unloading method 250. Method 250 utilizes a fill model, such as fill model 220, to control the unloading of material into a container so as to achieve a target fill profile for the container. Although method 250 described as being carried out using system 200, it should be appreciated that method 250 may likewise be carried out with any of the following described systems or with similar systems.

As indicated by block 254, unloading controller 224 obtains a current fill state of the container being moved proximate a moving unloading vehicle (the gathering/harvesting vehicle). The container may be carried, pushed or pulled by a transport vehicle. In one implementation, the current fill state is determined using stored historical values for the model variables 225 of the fill model 220 over time. In another implementation, the current fill state (the current existing fill profile) may be determined from perception-based data received from a perception system. For example, the current fill state may be obtained by analyzing images of the container, its interior and contents as captured by a camera or multiple cameras of the perception system.

As indicated by block 258, the unloading controller 224 consults a fill model of a fill characteristic of the container, such as fill model 220, as a function of variables. The variables may comprise a MUR and a MUL. In some implementations, the variables may comprise additional variables such as a moisture of the material being unloaded into the container.

As indicated by block 262, the unloading controller 224 may then adjust at least one of the MUT, the MUR and the MUL for the material being unloaded into the container based upon the current fill state and the fill model 220 with the objective of achieving the targeted fill profile for the container. In some implementations, blocks 254-262 are repeatedly cycled as the gathering/harvesting vehicle is unloading material into the container. In implementations where a perception system is provided, the cycle may be broken when the perception system is available or is chosen, wherein further control over the unloading of material into the container may be based upon a closed loop feedback provided by the implemented perception system. In some implementations, such a perception system may not be available for use, wherein the control over the unloading of material into the container is based upon the fill model 220 to completely fill the container according to the target fill profile.

Figure 10:
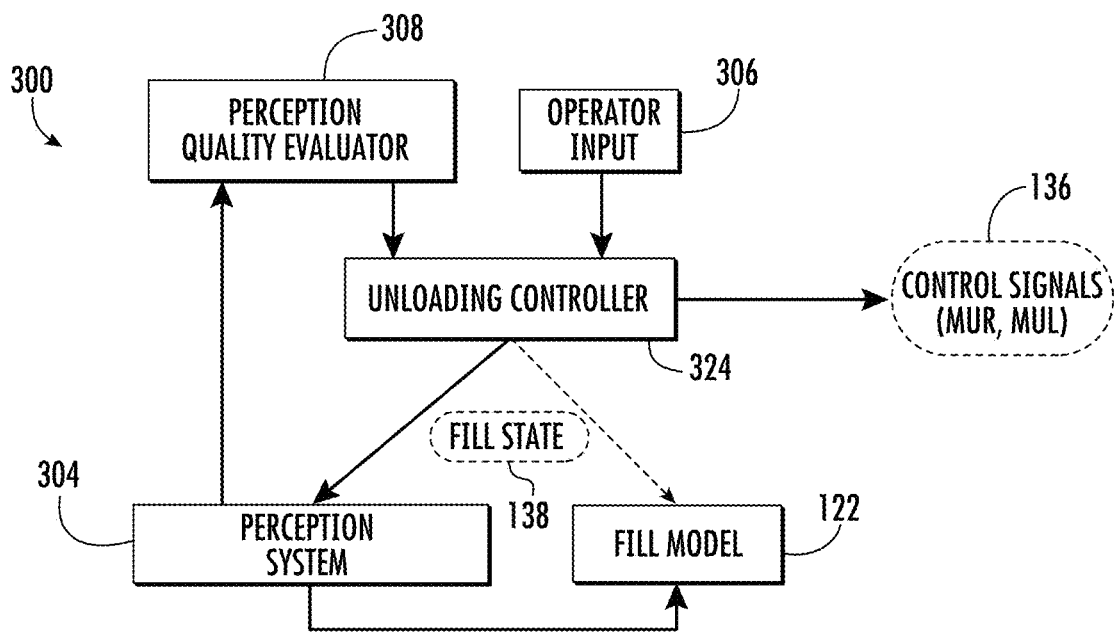
FIG. 10 is a block diagram schematically illustrating portions of an example vehicle automated unloading system.

FIG. 10 is a block diagram schematically illustrating portions of a vehicle automated unloading system 300. System 300 facilitates the automated unloading of material, such as grain, from a gathering/harvesting vehicle, such as a harvester, into a container of a transport vehicle. System 300 comprises perception system 304, fill model 220 (described above), operator input 306, perception quality evaluator 308 and unloading controller 324.

Perception system 304 comprises sensors that output perception data or perception signals representing at least one actual fill characteristic or state of the container. A fill characteristic may refer to a fill profile of the container, the distance separating a peak of material from the edge of the container or the like. Examples of sensors that may be utilized as part of the perception system include, but are not limited to, cameras, lidar, radar, ultrasonic sensors and the like. The perception signals produced by such perception systems may be signals that represent images or signals that represent point clouds.

In one implementation, perception system 304 may comprise cameras that output data are signals corresponding to the actual fill characteristics or state of the. For example, a gathering/harvesting vehicle, such as a harvester may include multiple cameras that are supported so as to capture images of the container itself, including its interior which may be filled with crop material. Such cameras may additionally be supported so as to capture images of the spout or other discharge point of the gathering/harvesting vehicle.

As indicated by arrow 309, in some implementations, data acquired by perception system 304 may be used to update or modify fill model 220. When perception system 304 is in use, the actual perceived fill characteristic may be compared to a corresponding fill characteristic as predicted by the current fill model 220. In case of sufficient discrepancy, the fill model 220 may be modified unloading controller 324 may further compare the PBFS with respect to the corresponding MBFS to evaluate the accuracy of the existing or current MBFS. In circumstances where the MBFS is different or sufficiently different than the actual sensed PBFS, unloading controller 324 may modify fill model 220 based upon the PBFS. As a result, the fill model 220 may be repeatedly, intermittently or continuously updated based upon actual harvesting or gathering conditions.

In some implementations, the configuration of the container being filled may be dynamically adjusted or updated using the perception data acquired by the perception system 304. For example, the perception system may sense the depth, outer perimeter or volume of the container into which material is being unloaded. In one implementation, cameras may be used to capture the configuration of the container being filled. In some implementations, cameras or other sensors may be used to sense a barcode identifier or other identifier on the container. In some implementations, such sensors may sense an RFID tag carried by the container. Use of the perception system to sense and determine the actual configuration or identity of the container may assist in ensuring that the proper fill model 220 is employed or that the results determine from the fill model 220 are accurate.

Fill model 220 is described above. Operator input 306 comprise an input device by which an operator may provide commands or selections to unloading controller 324, causing unloading controller 324 to control unloading of material into the transport vehicle using either perception system 304 or fill model 220. In one implementation, operator input 306 may comprise any of various input devices such as a touchscreen, a microphone with associated audio or speech recognition software, a mouse, a slide bar, a toggle switch, a button or the like.

Perception quality evaluator 308 comprises a subsystem or module for evaluating the reliability or accuracy of the data received from perception system 304. For example, sensed lighting conditions, sensed airborne particulates such as dust or chaff, and/or degree of occlusion or blockage of a sensor (such as the degree of occlusion of a camera lens or the like) may impact the accuracy and/or reliability of the data received from perception system 304. Evaluator 308 carries out a performance evaluation that may be used in the determination of whether the fill model or the perception system should be used to determine the current fill state of the container and/or determine adjustments to forthcoming unloading parameters. In some implementations, such switching is automatic. In other implementations, the systems and methods may output a notification to the operator recommending a switch, wherein the operator may or may not enter a command initiating the switch.

In one implementation, perception quality evaluator 308 comprises sensors that detect the amount of airborne particulates, such as dust or chaff, that may impede or inhibit the imaging of the container or its contents. In one implementation, perception quality evaluator 308 may comprise sensors that detect the lighting conditions, such as a lowlight condition or a poor sun location, that might impact or inhibit the imaging of the container or its contents. In some implementations, perception quality evaluator 308 may comprise sensors that evaluate what cameras or sensors are operable, what cameras or sensors are inoperable or the degree to which certain cameras or sensors are partially blocked or occluded. Perception quality evaluator 308 may output a perception quality score for the current perceived data output by perception system 304. The score may be compared against a quality threshold to determine whether the data from perception system 304 should be used to determine the current fill state of the container and/or control unloading parameters or whether unloading controller 324 should be switched to alternatively use the fill model 220 to determine the current fill state of container and/or control unloading parameters.

Unloading controller 324 controls at least one aspect regarding the unloading of material from the gathering/harvesting vehicle into the container of the transport vehicle. Unloading controller 324 may operate in either a perception mode or a model mode. Unloading controller 324 may switch between the perception mode and the model mode based upon commands or requests received through operator input 306 or based upon the performance evaluation carried out by perception quality evaluator 308. In the perception mode or mode of operation, unloading controller 324 determines the fill state 138 of the container based upon the data or signals received from perception system 304. In the perception mode, unloading controller 324 continuously evaluates signals received from perception system 304 to adjust unloading parameters, such as BUR and BUL, with the objective of achieving a target fill profile for the container.

In the model mode of operation (shown by the broken line arrow), unloading controller 324 determines the fill state 138 of the container based upon stored values for the model variables 225 over time during the filling of the container. Using such stored values and fill model 220, unloading controller 224 may determine the current fill characteristic/state of container. Based upon the current fill characteristic/status container, a target fill profile for the container, and fill model 220, unloading controller 324 determines and outputs control signals 236 to adjust at least one of the MUR and the MUL. This process may be repeated multiple times as a container is filled during unloading to achieve the target fill profile for the container.

Figure 11:
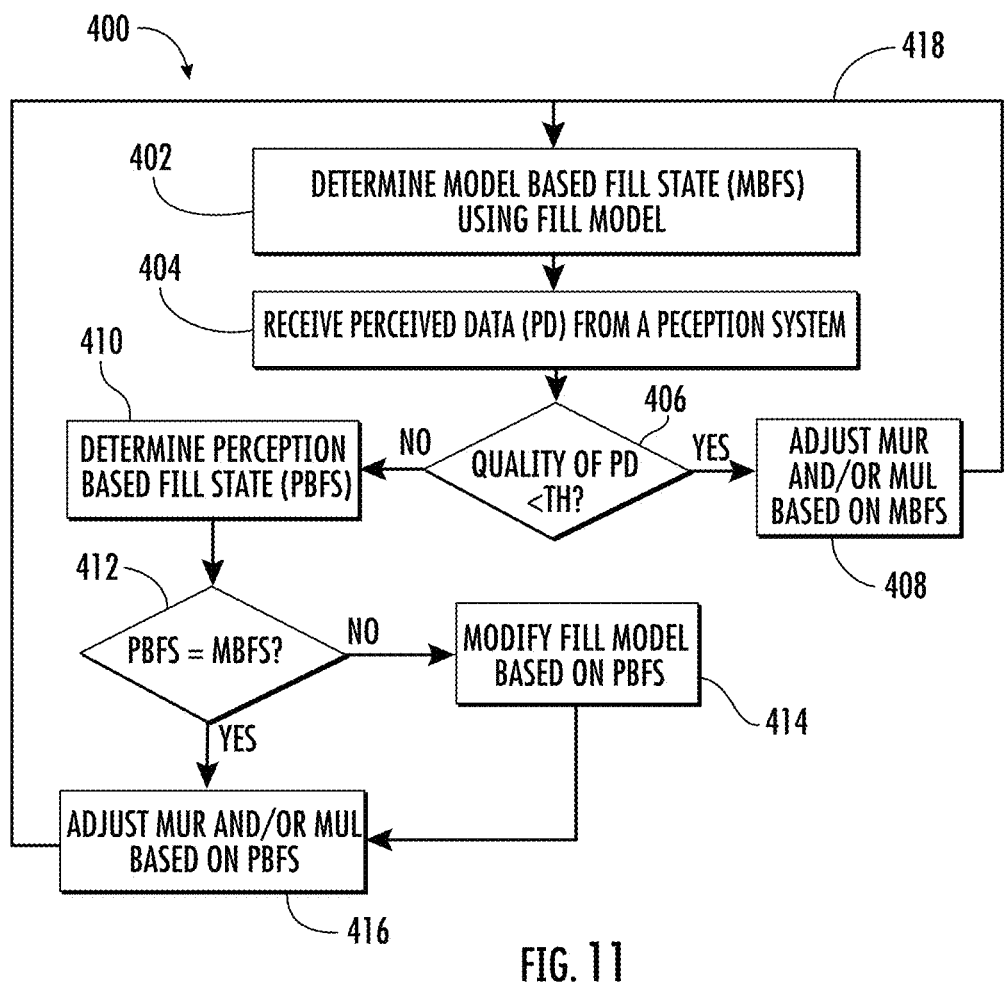
FIG. 11 is a flow diagram of an example vehicle automated unloading method.

FIG. 11 is a flow diagram of an example vehicle automated unloading method 400. Method 400 facilitates the automated unloading of a material from gathering/harvesting vehicle into a container of a transport vehicle. Although method 400 is described in the context of being carried out by system 300, it should be appreciated that method 400 may likewise be carried out with any of the systems described hereafter or with similar systems.

As indicated by block 402, unloading controller 324 may determine a model-based fill state (MBFS) using fill model 220. The MBFS comprise the predicted or estimated fill profile of the container based upon stored values for the model variables 225 over time during the filling of the container and the use of model 220 which is based upon the same model variables.

As indicated by block 404, unloading controller 324 may further receive perceived data (PD) from perception system 304. The perceived data may be in the form of signals received from cameras or other sensors, wherein the signals indicate the actual fill characteristics or fill state of the container.

As indicated by decision block 406, perception quality evaluator 308 identifies the quality of the perceived data. The quality of the perceived data that was received may be evaluated to determine the reliability or accuracy of the perceived data. Such an evaluation may involve an evaluation of one or more sensed perception system attributes or environmental conditions. For example, perception quality evaluator 308 may additionally comprise sensors that detect visibility conditions such as low light conditions, the angle of the sun, and/or the amount of airborne debris that may impact the quality of the images or quality of the sensor signals provided by perception system 304. Perception quality evaluator 308 may comprise sensors that detect the degree of blockage or occlusion of the lenses of the cameras of perception system 304. The detected visibility conditions are the detected camera occlusion may be compared against various thresholds (TH).

As indicated by block 408, in circumstances where the perception quality evaluation by perception quality evaluator 308 indicates that the reliability or accuracy of the data signal from perception system 304 is less than a predefined threshold TH, unloading controller 324 is switched to the use of or continues to use the MBFS to adjust and control or adjust the MUT, the MUR and/or MUL. Modification of the MUT may involve adjusting starting and/or stop time of unloading or adjusting the duration at which material is unloaded at a particular MUR and/or at a particular MUL. Modification of the MUR may comprise adjusting the rate at which an auger or other conveyor conveys material for discharge into the container. Modification of the MUL may comprise adjusting the relative position of the gathering/harvesting vehicle and the transport vehicle. For example, the container carried by the transport vehicle may be moved relative to the gathering/harvesting vehicle or a spout or other discharge point of the harvesting vehicle. The entire gathering such harvesting vehicle may be moved relative to the container.

In some implementations, the MUL location may be adjusted by adjusting the relative position of a discharge point of the gathering/harvesting vehicle and the container while the relative positioning of the vehicles themselves does not change. For example, the spout of a harvester may be elevated, rotated or otherwise moved relative to the remainder of the gathering/harvesting vehicle and relative to the container of the transport vehicle.

As indicated by block 410, in response to the quality of the perceived data being greater than the predefined quality threshold (the amount of airborne debris being less than a predetermined amount, the lighting conditions being greater than a predetermined amount, the percent of camera lens occlusion being less than a predetermined amount, and the like), unloading controller 324 may proceed with determining a perception-based fill state (PBFS) for the container. Unloading controller 324 may utilize the perceived data received from perception system 304 to determine the actual current fill state or the actual current fill profile of the container. For example, the images or point cloud captured of the container and its contents may identify what regions of the container filled with material, how close the material is with his sufficiently high (greater than the quality threshold respect to the perimeter edges of the container, and/or the location or spacing of any peaks or mounds of material within the container with respect to the center of the container and with respect to the edges of the container.

As indicated by decision block 412, unloading controller 324 may further compare the PBFS with respect to the corresponding MBFS to evaluate the accuracy of the existing or current MBFS. As indicated by block 414, in circumstances where the MBFS is different or sufficiently different than the actual sensed PBFS, unloading controller 324 may modify fill model 220 based upon the PBFS. As a result, the fill model 220 may be repeatedly, intermittently, or continuously updated based upon actual harvesting or gathering conditions.

As indicated by block 416, in circumstances where the quality of the perceived data is greater than the predetermined quality threshold TH, unloading controller 324 adjusts and controls at least one of the MUT, the MUR and the MUL using the current fill state (current fill profile) of the container captured by the perception system 304. Modification of the MUR may comprise adjusting the rate at which an auger or other conveyor conveys material for discharge into the container. Modification of the MUL may comprise adjusting the relative position of the gathering/harvesting vehicle and the transport vehicle. For example, the container carried by the transport vehicle may be moved relative to the gathering/harvesting vehicle or a spout or other discharge point of the harvesting vehicle. The entire gathering such harvesting vehicle may be moved relative to the container.

In some implementations, the unloading of material may be carried out in accordance with different predetermined unloading "control itineraries", each control itinerary comprising an unloading schedule or plan. For example, a first control itinerary may comprise unloading at a first rate for a first duration of time at a first location while a second control itinerary may comprise unloading at a second rate for a second duration of time at a second unloading location, wherein at least one of the second rate, second duration or second unloading location is different than the respective first duration, first rate or first unloading location. The adjusting of the MUT, the MUR and/or the MUL may comprise switching from one control itinerary to another control itinerary.

In some implementations, the MUL location may be adjusted by adjusting the relative position of a discharge point of the gathering/harvesting vehicle and the container while the relative positioning of the vehicles themselves does not change. For example, the spout of a harvester may be elevated, rotated or otherwise moved relative to the remainder of the gathering/harvesting vehicle and relative to the container of the transport vehicle. As indicated by arrow 418, this process is repeated or cycled during the unloading of material into the container in an effort to achieve a targeted fill profile. As a result, the target fill profile for the container may be achieved even in poor lighting or dusty conditions where perception system 304 may not be available for use or may be inaccurate.

Figure 12:
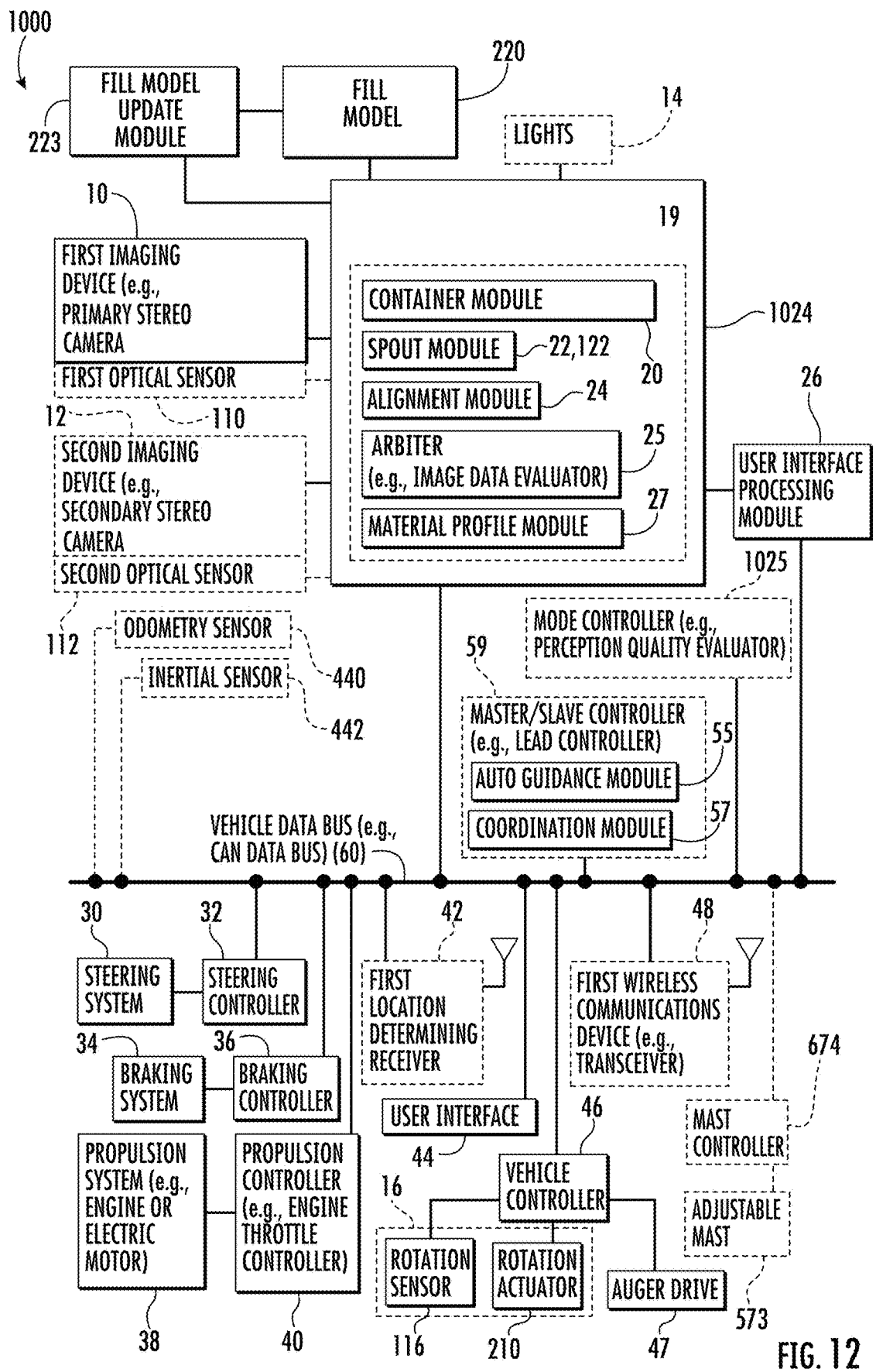
FIG. 12 is a block diagram schematically illustrating portions of an example vehicle automated unloading system.

FIG. 12 is a block diagram of portions of an example vehicle automated unloading system 2000. System 2000 is similar to the machine vision-automatic guidance system 11 shown and described in U.S. Pat. No. 9,861,040 issued to Bonefas on Jan. 9, 2018 except that system 2000 additionally comprises fill model 220 and fill model update module 223. System 2000 is similar to system 11 described in U.S. Pat. No. 9,861,040 except that system 2000 is additionally configured to carry out method 400 described above.

FIG. 12 illustrates an example of a machine vision-augmented guidance system 2000 for a transferring vehicle for managing the unloading of agricultural material (e.g., grain) from the transferring vehicle (e.g., combine) to a receiving vehicle (e.g., grain cart or wagon). A transferring vehicle may have a spout for directing agricultural material toward a storage portion of the receiving vehicle. For example, a stereo imaging system augments satellite navigation receivers or location-determining receiver 42 for guidance of one or more vehicles. In one implementation, the system 2000 comprises a first imaging device 10 and an optional second imaging device 12 coupled to an unloading controller 1024. The first imaging device 10 may be mounted on the transferring vehicle. The first imaging device 10 may comprise a primary stereo camera, while the second imaging device 12 may comprise a secondary stereo camera. In one configuration, the second imaging device 12 or secondary stereo camera is optional and provides redundancy to the first imaging device 10 in case of failure, malfunction or unavailability of image data from the first imaging device 10.

The first imaging device 10 and the second imaging device 12 may provide digital data format output as stereo video image data or a series of stereo still frame images at regular or periodic intervals, or at other sampling intervals. Each stereo image (e.g., the first image data or the second image data) has two component images of the same scene or a portion of the same scene. For example, the first imaging device 10 has a first field of view of the storage portion of the receiving vehicle, where the first field of view overlaps at least partially with a second field of view of the second imaging device 12 (if present). In one implementation, the first imaging device 10, the second imaging device 12, or both may comprise a charge-coupled device (CCD), a complementary metal-oxide semiconductor (CMOS) array, or another suitable device for detection or collection of image data.

In one configuration, an optical sensor (110, 112) comprises a light meter, a photo-sensor, photo-resistor, photo-sensitive device, or a cadmium-sulfide cell. A first optical sensor 110 may be associated with the first imaging device 10; a second optical sensor may be associated with the second imaging device 12. The first optical sensor 110 and the second optical sensor 112 each may be coupled to the unloading controller 1024. The optical sensor (110, 112) provides a reading or level indicative of the ambient light in the field of view of its respective imaging device (10, 12).

The unloading controller 1024 serves as an image processing module. The unloading controller 1024 may be coupled, directly or indirectly, to optional lights 14 on a vehicle (e.g., transferring vehicle) for illumination of a storage container (e.g., 85 in FIG. 16A) and/or spout (e.g., 89 in FIG. 16A). For example, the unloading controller 1024 may control drivers, relays or switches, which in turn control the activation or deactivation of optional lights 14 on the transferring vehicle. The optional lights 14 are shown in dashed lines because the lights 14 are optional and may be deleted in certain alternate implementations. The unloading controller 1024 may activate the lights 14 on the vehicle for illumination of the storage container (e.g., 85 in FIG. 16A), spout 89 or both if an optical sensor (110, 112) or light meter indicates that an ambient light level is below a certain minimum threshold. In one configuration the optical sensor (110, 112) face toward the same direction as the lens or aperture of the imaging devices (10, 12).

In one implementation, an auger rotation system 16 may comprise: (1) a rotation angle sensor 116 for sensing a spout rotation angle ($\alpha$ in FIG. 16A and $\beta$ in FIG. 16B) of the spout 89 with respect to one or more axes of rotation and (2) an actuator 210 for moving the spout 89 to change the spout rotation angle; hence, the spout position with respect to the receiving vehicle 79 or its storage container 85. The actuator 210 may comprise a motor, a linear motor, an electro-hydraulic device, a ratcheting or cable-actuated mechanical device, or another device for moving the spout 89, or the spout end 87. The spout rotation angle may comprise a simple angle, a compound angle or multi-dimensional angles that is measured with reference to a reference axis parallel to the direction of travel of the transferring vehicle. In one configuration, one or more of the following communicates with the vehicle controller 46 through transmission line or a secondary data bus: a rotation sensor 116, a rotation actuator 210, an auger rotation system 16, or an auger driver 47.

If the actuator 210 comprises an electro-hydraulic device, the use of proportional control valves in the hydraulic cylinder of the electro-hydraulic device that rotates the spout (or changes the spout rotation angle) facilitates finer adjustments to the spout angle (e.g., a than otherwise possible. Accordingly, proportional control valves of the electro-hydraulic device support or actuator 216 supports an even profile or distribution of unloaded agricultural material within the storage portion 93 or container 85. Many commercially available combines are typically equipped with non-proportional control valves for controlling spout angle or movement of the spout 89; electro-hydraulic devices with non-proportional control valves can fill the storage container with an inefficient multi-modal or humped distribution (e.g., 508) of agricultural material with local high areas and local low areas, as depicted in FIG. 11C, for example.

A vehicle controller 46 may be coupled to the vehicle data bus 60 to provide a data message that indicates when the auger drive 47 for unloading agricultural material from the transferring vehicle is activate and inactive. The auger drive 47 may comprise an auger, an electric motor for driving the auger, and a rotation sensor for sensing rotation or rotation rate of the auger or its associated shaft. In one implementation, the auger (not shown) is associated with a container for storing agricultural material (e.g., a grain tank) of a transferring vehicle (e.g., a combine). If the vehicle controller 46 (e.g., auger controller) indicates that the auger of the transferring vehicle is rotating or active, the imaging processing module 18 activates the spout module 22 and container module 20. Thus, the auger rotation system 16, or its associated vehicle controller 46, may conserve data processing resources or energy consumption by placing the container module 20 and the spout module 22 in an inactive state (or standby mode) while the transferring vehicle is harvesting, but not unloading, the agricultural material to the receiving vehicle.

In FIG. 12, the imaging processing module 18 or any other controller may comprise a controller, a microcomputer, a microprocessor, a microcontroller, an application specific integrated circuit, a programmable logic array, a logic device, an arithmetic logic unit, a digital signal processor, or another data processor and supporting electronic hardware and software. In one implementation, the unloading controller 1024 comprises a container module 20, a spout module 22, an alignment module 24, a material profile module 27, and an arbiter 25. Each module may comprise a software module, an electronic module, or both, where the software module comprises software instructions for executing functions described in this document.

The unloading controller 1024 may be associated with a data storage device 19. The data storage device 19 may comprise electronic memory, non-volatile random-access memory, a magnetic disc drive, an optical disc drive, a magnetic storage device or an optical storage device, for example. If the container module 20, the spout module 22 and the alignment module 24, material profile module 27 and arbiter 25, are software modules they can be stored within the data storage device 19.

Figure 16A:
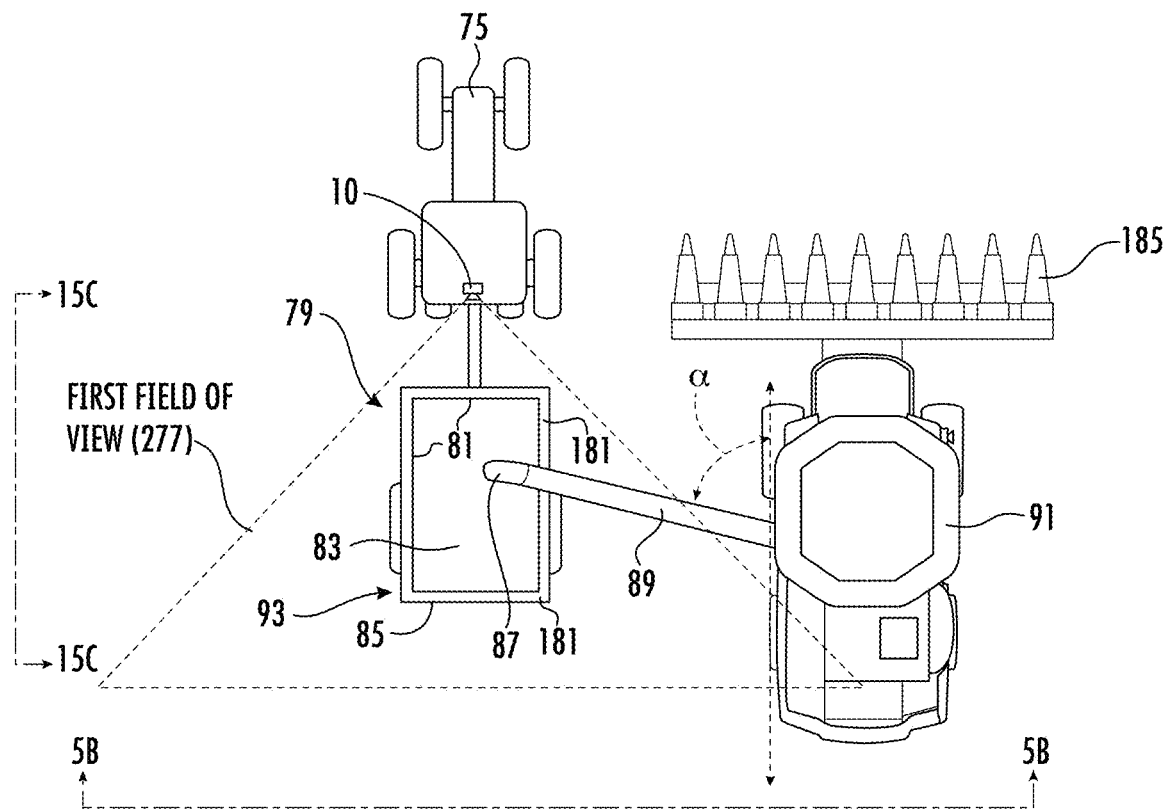
FIG. 16A illustrates a plan view of an imaging device (e.g., a stereo vision system) mounted on a receiving vehicle and facing a storage portion of the receiving vehicle.

The container module 20 identifies a set of two-dimensional or three dimensional points (e.g., in Cartesian coordinates or Polar coordinates) in the collected image data or in the real world that define a container position or at least a portion of the container perimeter (e.g., 81 in FIG. 16A) or the storage portion (e.g., 85 in FIG. 16A). The set of two-dimensional or three-dimensional points correspond to pixel positions in images collected by the first imaging device 10, the second imaging device 12, or both. The container module 20 may use or retrieve container reference data.

The container reference data comprises one or more of the following: reference dimensions (e.g., length, width, height), volume, reference shape, drawings, models, layout, and configuration of the container 85, the container perimeter 81, the container edges 181; reference dimensions, reference shape, drawings, models, layout, and configuration of the entire storage portion 93 of receiving vehicle; storage portion wheelbase, storage portion turning radius, storage portion hitch configuration of the storage portion 93 of the receiving vehicle; and distance between hitch pivot point and storage portion wheelbase. The container reference data may be stored and retrieved from the data storage device 19 (e.g., non-volatile electronic memory). For example, the container reference data may be stored by, retrievable by, or indexed by a corresponding receiving vehicle identifier in the data storage device 19 of the transferring vehicle system 11. For each receiving vehicle identifier, there can be a corresponding unique container reference data stored therewith in the data storage device 19.

In one implementation, the transferring vehicle receives a data message from the receiving vehicle in which a vehicle identifier of the receiving vehicle is regularly (e.g., periodically transmitted). In another implementation, the transferring vehicle interrogates the receiving vehicle for its vehicle identifier or establishes a communications channel between the transferring vehicle and the receiving vehicle in preparation for unloading via the wireless communication devices (48, 148). In yet another implementation, the receiving vehicle transmits its vehicle identifier to the transferring vehicle when the receiving vehicle approaches the transferring vehicle within a certain radial distance. In still another implementation, only one known configuration of receiving vehicle is used with a corresponding transferring vehicle and the container reference data is stored or saved in the data storage device 19. In the latter implementation, the transferring vehicle is programmed, at least temporarily, solely for receiving vehicles with identical containers, which are identical in dimensions, capacity, proportion and shape.

In one configuration, the container module 18 identifies the position of the controller as follows. If the linear orientation of a set of pixels in the collected image data conforms to one or more edges 181 of the perimeter (81 in FIG. 16A) of the container (85 in FIG. 16A) as prescribed by the container reference data, the position of the container has been identified. A target zone, central region or central zone of the container opening 83 of the container 85 can be identified by dividing (by two) the distance (e.g., shortest distance or surface normal distance) between opposite sides of the container, or by identifying corners of the container and where diagonal lines that intercept the corners intersect, among other possibilities. In one configuration, the central zone may be defined as an opening (e.g., circular, elliptical or rectangular) in the container with an opening surface area that is greater than or equal to the cross-sectional surface area of the spout end by a factor of at least two, although other surface areas fall within the scope of the claims. In one configuration, the spout module 22 identifies one or more of the following: (1) the spout pixels on at least a portion of the spout 89 (in FIG. 16A), (2) spout end pixels that are associated with the spout end 87 of the spout 89 (in FIG. 16A), (3) spout pixels associated with a spout position on or for the spout 89 (in FIG. 16A). The spout module 22 may use color discrimination, intensity discrimination, or texture discrimination to identify background pixels from one or more selected spout pixels with associated spout pixel patterns or attributes (e.g., color or color patterns (e.g., Red Green Blue (RGB) pixel values), pixel intensity patterns, texture patterns, luminosity, brightness, hue, or reflectivity) used on the spout 89 or on the spout end 87 of the spout 89 for identification purposes.

The alignment module 24, the master/slave controller 59, or both estimate or determine motion commands at regular intervals to maintain alignment of the spout (56 or 89) over the central zone, central region or target of the container 85 for unloading agricultural material. The alignment module 24, the master/slave controller 59, or both, may send commands or requests to the transferring vehicle with respect to its speed, velocity or heading to maintain alignment of the position of the transferring vehicle with respect to the receiving vehicle. For example, the alignment module 24 may transmit a request for a change in a spatial offset between the vehicles to the master/slave controller 59. In response, the master/slave controller 59 or the coordination module 57 transmits a steering command or heading command to the steering controller 32, a braking or deceleration command to a braking system 34, and a propulsion, acceleration or torque command to a propulsion controller 40 to achieve the target spatial offset or change in spatial offset. Further, similar command data may be transmitted via the wireless communication devices (48, 148) to the receiving vehicle for observational purposes or control of the receiving vehicle via its steering system controller 32, its braking controller 36, and its propulsion controller 40 of the system 311 of FIG. 14A.

Figure 14A:
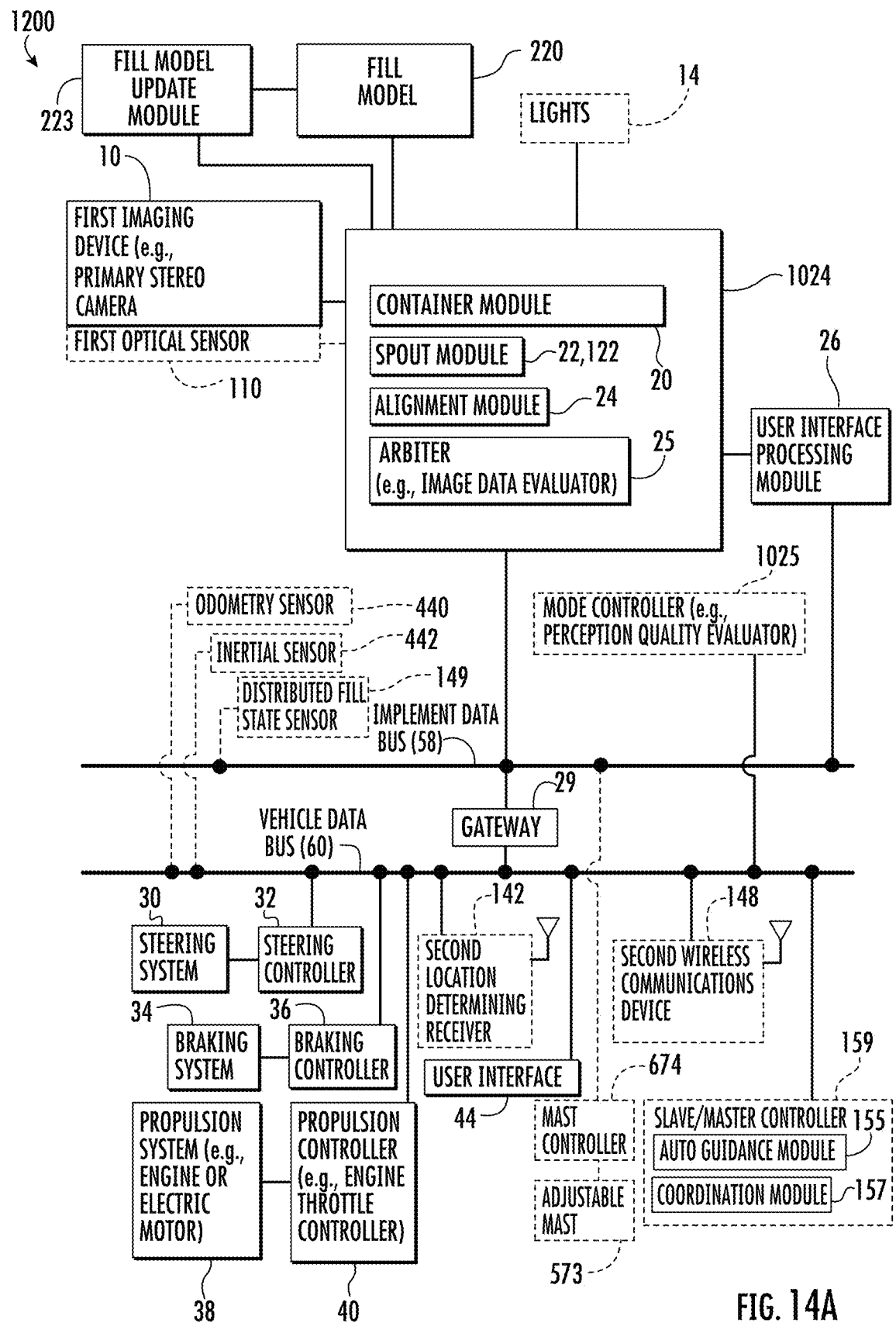
FIG. 14A is a block diagram of example vehicle automated unloading system.
Figure 14B:
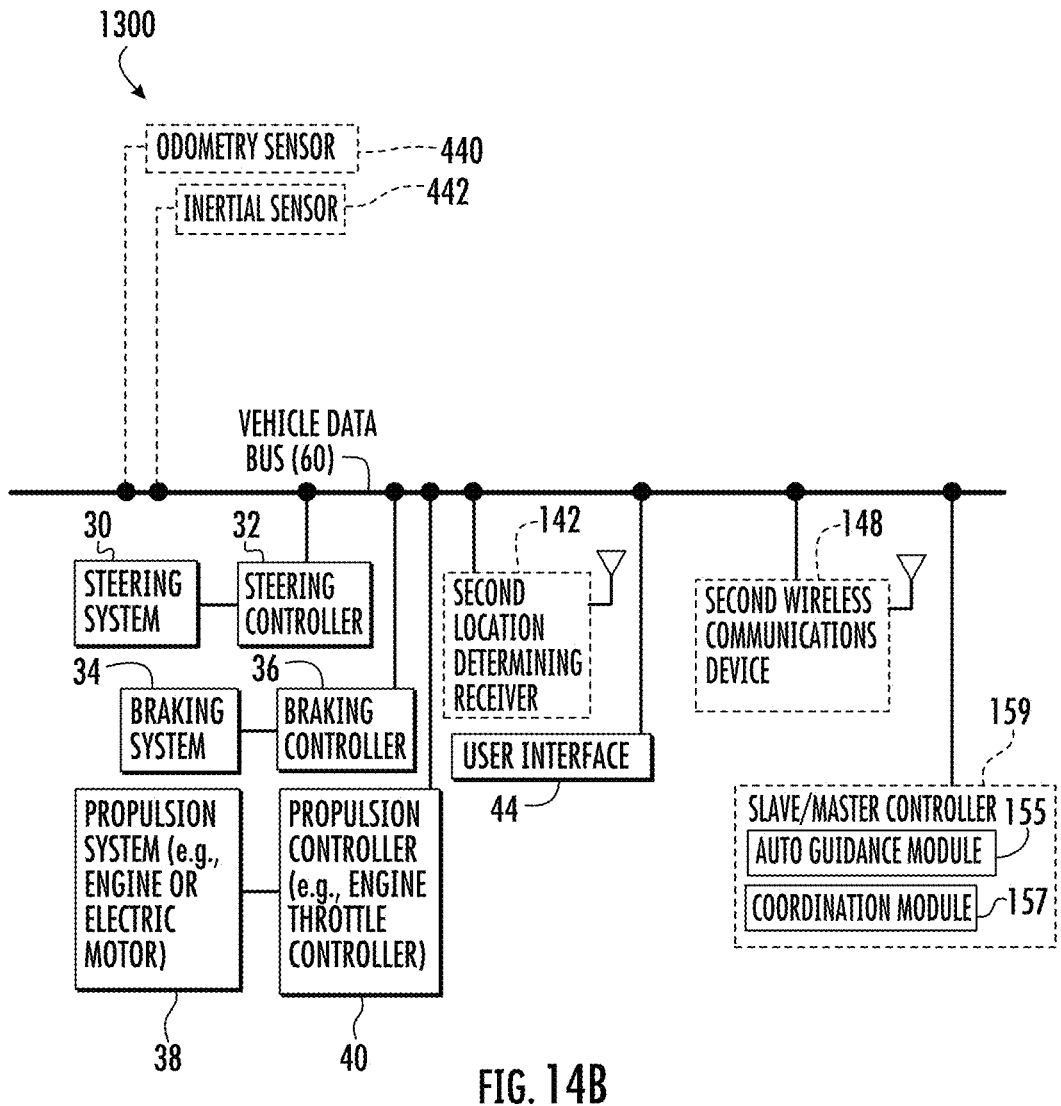
FIG. 14B is a block diagram of an example electronic or guidance system for a receiving vehicle for cooperation with the example vehicle automated unloading system of FIG. 12 or FIG. 13.

In another configuration, the alignment module 24 or unloading controller 1024 may regularly or periodically move, adjust or rotate the target zone or central zone during loading of the container 85 of the receiving vehicle to promote even filling, a uniform height, or uniform distribution of the agricultural material in the entire container 85, where the unloading controller 1024 identifies the fill state of the agricultural material in the image data from the material profile module 27 or receives fill state data from distributed fill state sensors 149 in FIG. 14A or FIG. 14B (associated with the container 85) via the wireless communication devices (48, 148).

The imaging module 18 may comprise material profile module 27 or a fill level sensor for detecting a one-dimensional, two-dimensional or three-dimensional representation of the fill level or volumetric distribution of the agricultural material in the container 85 or storage portion 93. For example, FIG. 16C shows various illustrative two-dimensional representations of the fill state of the container 85, or the distribution of agricultural material in the container 85, where FIG. 16C will be described later in detail.

In one configuration, the coordination module 57 or the steering controller 32 adjusts the relative position (of offset, such as the offset components illustrated in FIG. 15A) of the transferring vehicle to the receiving vehicle. For example, the steering controller 32 associated with the steering system 30 of the transferring vehicle can steer the transferring vehicle in accordance with a cooperative alignment (e.g., that is suitable for efficiently transferring material from the transferring vehicle to the receiving vehicle, while both are in generally forward motion) based on location data and motion data from first location-determining receiver 42 and the second location-determining receiver 142. With or without such location and motion data from the one or more location-determining receivers (42, 142), the alignment module 24, the coordination module 57 and the auger rotation system 16 may control the relative position of the spout 89 or the spout end 87 to the container perimeter 81 to achieve an even fill to the desired fill level. For example, actuator 210 or the auger rotation system 16, alone or in combination with its vehicle controller 46, may adjust the spout angle (e.g., a first spout angle ($\alpha$) or rotation angle, a second spout angle ($\beta$) or tilt angle, or a compound angle ($\alpha$ and $\beta$)) that the spout 89 makes with respect to a reference axis or reference coordinate system associated with the transferring vehicle 91 or a generally vertical plane associated with the direction of travel of the transferring vehicle 91, where the spout 89 meets and rotates with respect to the vehicle.

The spout end 87 may be adjusted for unloading agricultural material by shifting its spout angle or spout position, within the container perimeter 81 and a tolerance clearance from the container perimeter 81 within the container 85. The spout end 87 may be adjusted by various techniques that may be applied alternately, or cumulatively. Under a first technique, the alignment module 24 adjusts the spout end 87 for unloading agricultural material by shifting its spout angle (e.g., a first spout angle ($\alpha$) or rotation angle, a second spout angle ($\beta$) or tilt angle, or both.) The rotation actuator (210 or 260), or the rotation actuator 260 and the tilt actuator 262 may adjust the rotation angle, the tilt angle, or both with respect to the transferring vehicle to place the spout 89 or spout end 87 in cooperative alignment based on the collected image data for a sampling period.

Under a second technique, the alignment module 24 requests (or commands) the coordination module 57 to adjust the fore/aft offset adjustment ($\phi$ or $\varphi$), the lateral adjustment ($\Delta$), or both, where the coordination module 57 manages or choreographs the relative fore/aft offset and lateral offset between the transferring vehicle and receiving vehicle by moving the transferring vehicle, the receiving vehicle, or both. Under a third technique, the alignment module 24 primarily adjusts the spout end 87 for unloading agricultural material by shifting its spout angle and the coordination module 57 secondarily and regularly (e.g., periodically) moves the fore/aft offset and the lateral offset by fore/aft offset adjustment ($\phi$ or $\varphi$) the lateral adjustment ($\Delta$), respectively, to achieve a uniform fill state or level loading of the container with the agricultural material. Accordingly, the spout end 87 may be adjusted regularly (e.g., in a matrix of one or more rows or columns of preset offset positions) for unloading agricultural material by shifting the spatial relationship between the transferring vehicle and the receiving vehicle by a fore and aft offset or a lateral offset to achieve a target alignment or desired even distribution of filling the container 85 or storage portion 93 with agricultural material, while using the spout angle adjustment for fine tuning of the distribution of the agricultural material within the container (e.g., from each position within the matrix).

In the unloading controller 1024, the arbiter 25 comprises an image data evaluator. For example, the arbiter 25 may comprise an evaluator, a judging module, Boolean logic circuitry, an electronic module, a software module, or software instructions for determining: (1) whether or not to use the first image data (e.g., from the first imaging device 10), the second image data, or both, and/or (2) whether or not to use the unloading controller 1024 (or its output data) for alignment of a relative position of the spout and the container perimeter (or alignment of the spatial offset between the vehicles). In one implementation the arbiter determines whether or not to use the first image data, the second image data, and the output data of the unloading controller 1024 based on evaluation one or more of the following metrics, factors or criteria during one or more sampling periods: material variation of intensity of pixel data, material variation in ambient light conditions during, image rectification quality, disparity image quality, stereo correspondence data quality, reliability, extent or degree of identification of edges of one or more image objects (e.g., spout, spout end, container perimeter, storage portion) or image data quality, reliability of coordinate estimation (e.g., three dimensional coordinates) of one or more objects in the image. The arbiter 25 may communicate one or more quality indicators (e.g., third indicator message) to the mode controller 1025 (e.g., via a data bus, a logical data path, a physical data path, or a virtual data path).

An optional mode controller 1025 is coupled to the data bus (e.g., 60). The mode controller 1025 is shown in dashed lines to indicate that it is optional. The mode controller 1025 may comprise a perception quality evaluator, a judging module, Boolean logic circuitry, an electronic module, a software module, or software instructions for determining whether to operate the machine-vision-augmented guidance system (e.g., 1000, 1100, or 1200) in: (1) an operator-directed manual mode in which one or more human operators steer the receiving vehicle, the transferring vehicle or both during transfer of agricultural material from the transferring vehicle to the steering vehicle; (2) an automated mode in which the receiving vehicle, the transferring vehicle or both are steered and aligned automatically during transfer of agricultural material from the transferring vehicle to the receiving vehicle; or (3) a semi-automated mode or partially automated mode in which one or more operators supervise and can override the automated steering and alignment of the transferring vehicle and the receiving vehicle. For example, the mode controller 1025 may determine whether to use an automated control mode of the spout or an operator-directed manual control mode of the spout based on a first operational status of a first location-determining receiver 42 associated with the transferring vehicle, a second operational status of a second location-determining receiver 142 associated with the receiving vehicle, and a third operational status of the first imaging device 10 or an unloading controller 1024 (e.g., on the transferring vehicle or the receiving vehicle).

In one configuration, the automated control mode comprises an operational mode where an unloading controller 1024 processes the collected image data to facilitate the determination of the relative position of the spout 89 (e.g., the spout end 87) and the storage portion 93 (or its container perimeter or a central zone of the storage portion 93). Further, in the automated control mode, the unloading controller 1024 may generate command data to place the storage portion 93 (or its container perimeter or central zone) and the spout 89 (e.g., the spout end 87) such that the spout is aligned for transferring of agricultural material into the storage portion 93. The command data may comprise one or more of the following: steering command data for the receiving vehicle, steering command data for the transferring vehicle, or actuator command data for rotating or otherwise manipulating any actuators (e.g. for rotation, tilt or deflection) of the spout.

In one implementation, the mode controller 1025 comprises a perception quality evaluator that evaluates the functionality, diagnostics, performance, tests or quality of one or more location-determining receivers (42, 142), imaging devices (10, 12), range finders, odometrical sensor (440), dead-reckoning sensors, inertial sensors (442), navigation sensors, or other perception sensors. In one illustrative example, the first operational status is acceptable if the first location-determining receiver 42 provides reliable position data that meets or exceeds a dilution of precision threshold or another navigation satellite reliability measure during a sampling period; the second operational status is acceptable if the second location-determining receiver 142 provides reliable position data that meets or exceeds a dilution of precision threshold or another navigation satellite reliability measure (e.g., total equivalent user range error) during a sampling period. Further, the third operational status is acceptable if the first imaging device 10 provides reliable image data in which the container module 20 or spout module 22 (e.g., or the respective edge detection modules therein) are capable of any of the following: (1) reliably identifying or resolving one or more edges of spout 89, the spout end 87, the container perimeter 81 or a portion thereof, or the storage portion 93 in the collected image data during a sampling time period, (2) reliably identifying on a time percentage basis (e.g., at least 99.99% of the time) one or more reference objects (e.g., a reference pattern or reference image on the spout or receiving vehicle) or objects in the image data, (3) reliably determining (e.g., via stereo correspondence or disparity processing) coordinates (e.g., in three dimensions) of a material portion (e.g., a group or constellation of reference points) on one or more of the following: the spout 89, the spout end 87, the storage portion, container perimeter or a portion thereof during a sampling period, or (4) reliably identifying (e.g., via an edge detector 105 or other processing) one or more edges of the spout end 87 and one or more edges of the container perimeter 81 of the storage portion.

Figure 13:
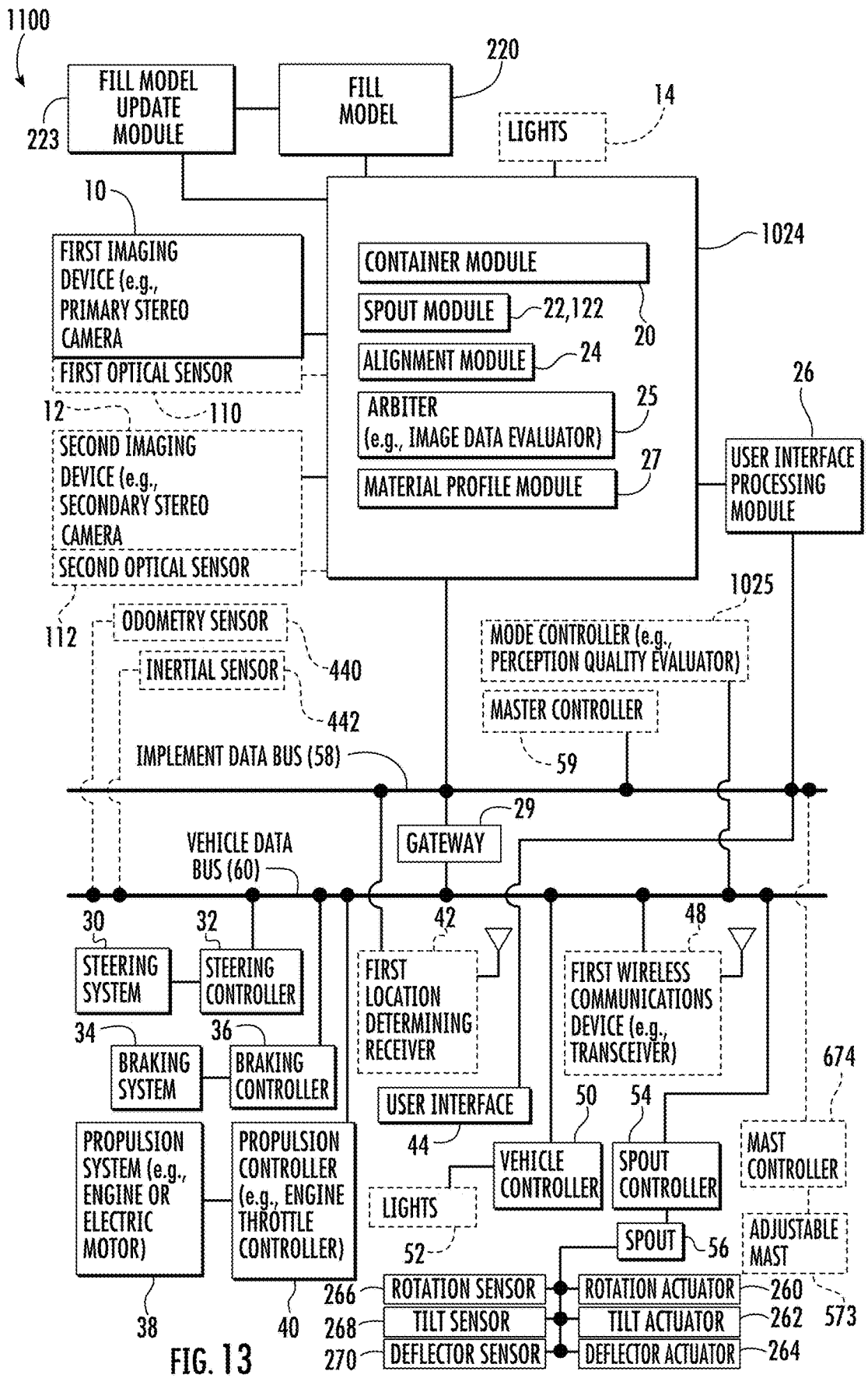
FIG. 13 is a block diagram of example vehicle automated unloading system.

In one configuration in FIG. 12 and FIG. 13, the systems (1000, 1100, or 1200) may use a detected rotation angle (of the spout 89) detected by the rotation sensor 116 or 266, respectively, along with a known length of the spout 89 to estimate the spout position or the coordinates (e.g., in three dimensions) of the spout end 87. However, where the rotation angle or the rotation sensor (116 or 266) is not present, operating, or in communication with the unloading controller 1024, the spout module (22 or 122) may use image processing for any of the following: (1) to estimate a spout angle or rotation angle of the spout with respect to the transferring vehicle, (2) to estimate a spout position (e.g., three dimensional coordinates) of the spout 89, and (3) to estimate a spout position (e.g., three dimensional coordinates) of the spout end 87.

Dilution of precision provides a FIG. of merit of the performance of a location-determining receiver (e.g., 42, 142) that uses a satellite navigation system, such as the Global Positioning System (GPS) or Global Navigation Satellite System (GLONASS). Dilution of precision captures the time-varying impact of spatial geometry and separation between a location-determining receiver (42, 142) and satellites signals that are received by the location-determining receiver, as opposed to clock errors, ionospheric errors, multipath errors, and other errors. The precision in pseudo-range estimate to each satellite can affect the accuracy of the determination of a three dimensional position estimate and time estimate of the location-determining receiver (42, 142). If receivable navigation satellites are spatially too close together in orbit for a given location-determining receiver a particular time, accuracy of the position estimate may be compromised and the dilution of precision value can be higher than normal or acceptable.

In one implementation, the first location-determining receiver 42 provides a first indicator message that indicates that the first location-determining receiver 42 meets or exceeds a precision dilution threshold; the second location-determining receiver 142 provides a second indicator message that indicates that the second location-determining receiving 142 exceeds a precision dilution threshold; and the unloading controller 1024 provides a third indicator message that indicates that the unloading controller 1024 is capable of reliably identifying one or more edges of the spout end 87 and one or more edges of the container perimeter 81 of the storage portion 93 during a sampling period.

If the mode controller 1025 is separate from the unloading controller 1024, any failure or disruption of the functioning of the unloading controller 1024, its hardware or its software is generally separate and distinct from any failure of disruption of the functioning of the mode controller 1025, which adds a measure of redundancy and reliability to the system (e.g., 1000, 1100, or 1200). Although the mode controller 1025 is shown separate and outside of the unloading controller 1024, in an alternate implementation the mode controller 1025 may be incorporated into the unloading controller 1024, which could potentially reduce the cost of the system (e.g., 1000, 1100, or 1200).

A master/slave controller 59 is coupled to the data bus (e.g., 60). In one implementation, the master/slave controller 59 comprises an auto-guidance module 55 and coordination module 57. The auto-guidance module 55 or master/slave controller 59 can control the transferring vehicle in accordance with location data from the first location-determining receiver 42 and a path plan or desired vehicle path (e.g., stored in data storage 19). The auto-guidance module 55 or master/slave controller 59 sends command data to the steering controller 32, the braking controller 36 and the propulsion controller 40 to control the path of the transferring vehicle to track automatically a path plan or to track manually steered course of an operator via the user interface 44 or steering system 30.

The coordination module 57 may facilitate alignment of movement (e.g., choreography) between the transferring vehicle (e.g., 91 in FIG. 15A) and the receiving vehicle (e.g., 79 in FIG. 15A) during unloading or transferring of agricultural material between the vehicles. For example, the coordination module 57 may facilitate maintenance of a uniform lateral offset (Δ in FIG. 15A) and a uniform fore/aft offset (φ or φ in FIG. 15A) between the vehicles during unloading of the agricultural material, subject to any adjustments for attainment of a uniform distribution of material in the container 85. Collectively, the uniform lateral offset and uniform for/aft offset may be referred to as a uniform spatial offset. In certain implementations, maintenance of the lateral offset and fore/aft offset, or coordination of any shift in the lateral offset and fore/aft offset (e.g., pursuant to a two-dimensional matrix of pre-established positions (x, y points) for uniform loading of a respective particular container or storage portion similar to that illustrated in FIG. 16D), is a necessary or desired precondition to implementing spout angle adjustment of the spout 89 or spout end 87 by the alignment module 24.

In one implementation in a leader mode, the transferring vehicle is steered by the auto-guidance module 55 or the steering controller 32 in accordance with path plan, or by a human operator. The master/slave controller 59 or coordination module 57 controls the receiving vehicle in a follower mode via the slave/master controller 159, where the transferring vehicle operates in the leader mode. If the transferring vehicle operates in an automated mode or auto-steering mode, the master/slave controller 59 provides command data locally to the steering controller 32, braking controller 36, and propulsion engine controller 40 of the transferring vehicle. Such command data can be normalized (or scaled), time stamped, and communicated to the receiving vehicle via wireless communication devices (48, 148) for processing by the slave/master controller 159. Alternatively, the velocity, acceleration, and heading data of the transferring vehicle is communicated to the receiving vehicle via the wireless communications devices (48, 148) to enable to receiving vehicle to follow the path of the transferring vehicle (e.g., with a minimal time delay). In an automated mode and in a leader-follower mode, the receiving vehicle, the transferring vehicle or both are steered and aligned automatically during transfer of agricultural material from the transferring vehicle to the receiving vehicle.

The unloading controller 1024 provides image data to a user interface processing module 26 that provides, directly or indirectly, status message data and performance message data to a user interface 44. As illustrated in FIG. 12, the unloading controller 1024 communicates with a vehicle data bus 60 (e.g., Controller Area Network (CAN) data bus).

In one implementation, a location-determining receiver 42, a first wireless communications device 48, a vehicle controller 46, a steering controller 32, a braking controller 36, and a propulsion controller 40 are capable of communicating over the vehicle data bus 60. In turn, the steering controller 32 is coupled to a steering system 30 of the transferring vehicle; the braking controller 36 is coupled to the braking system 34 of the transferring vehicle; and the propulsion controller 40 is coupled to the propulsion system 38 of the transferring vehicle.

In FIG. 12, the steering system 30 may comprise an electrically-driven steering system, an electro-hydraulic steering system, a gear driven steering system, a rack and pinion gear steering system, or another steering system that changes the heading of the vehicle or one or more wheels of the vehicle. The braking system 34 may comprise a regenerative braking system, an electro-hydraulic braking system, a mechanical braking system, or another braking system capable of stopping the vehicle by hydraulic, mechanical, friction or electrical forces. The propulsion system 38 may comprise one or more of the following: (1) the combination of an electric motor and an electric controller, (2) internal combustion engine that is controlled by an electronic fuel injection system or another fuel metering device that can be controlled by electrical signals, or (3) a hybrid vehicle in which an internal combustion engine drives a electrical generator, which is coupled to one or more electric drive motors.

The system 2000 facilitates the transfer of agricultural material from the transferring vehicle (e.g., a harvesting vehicle) to a receiving vehicle. The system 2000 comprises a receiving vehicle with a propelled portion for propelling the receiving vehicle and a storage portion 93 for storing agricultural material. A stereo imaging device, such as the first imaging device 10, faces towards the storage portion 93 of the receiving vehicle. As shown in FIG. 12, the first imaging device 10 and the optional second imaging device 12 are mounted on the transferring vehicle, consistent with FIG. 15A. However, in alternate implementations, the first imaging device 10, the optional second imaging device 12, or both may be mounted on the receiving vehicle or the propulsion portion 75 of the receiving vehicle as shown in FIG. 16A, or arranged in other possible configurations.

One or more imaging devices (10, 12) are arranged to collect image data. A container module 20 identifies a container perimeter 81 of the storage portion 93 in the collected image data. The storage portion 93 has an opening inward from the container perimeter for receipt of the agricultural material. A spout module 22 is configured to identify a spout (e.g., 89 of FIG. 15A) of the harvesting vehicle in the collected image data. An alignment module 24 is adapted for determining the relative position of the spout 89 and the container perimeter (81 of FIG. 15A) and for generating command data to the transferring vehicle or the propelled portion 75 of the receiving vehicle 79 to steer the storage portion 93 in cooperative alignment such that the spout 89 is aligned within a central zone or container opening 83 of the container perimeter 81. A steering controller 32 is associated with a steering system 30 of the propelled portion for steering the receiving vehicle in accordance with the cooperative alignment.

In one implementation, an optional mast controller 674, indicated by dashed lines, is coupled to the vehicle data bus 60, the implement data bus, or the unloading controller 1024 to control an optional adjustable mast 573 for mounting and adjustably positioning the first imaging device 10, the second imaging device 12, or both. The mast controller 674 is adapted to change the orientation (e.g., compound angular orientation) or height above ground of the first imaging device 10, the second imaging device 12 or both, where the orientation may be expressed as any of the following: a tilt angle, a pan angle, a down-tilt angle, a depression angle, or a rotation angle.

In one configuration, a user interface 44 is arranged for entering container reference data or dimensional parameters related to the receiving vehicle. For example, the container reference data or dimensional parameters comprise a distance between a trailer hitch or pivot point (which interconnects the propulsion unit 75 and the storage portion 93) and front wheel rotational axis of the storage portion 93 of the receiving vehicle 79.

In FIG. 12, the first imaging device 10 comprises a monocular imaging device and the second imaging device 12 comprises a monocular imaging device that provides first monocular image data and second monocular image data, respectively. The unloading controller 1024 or system (e.g., 1000, 1100, or 1200) can create a stereo image from the first monocular image data (e.g., right image data) and the second monocular image data (e.g., left image data) with reference to the relative position and orientation of the first imaging device 10 and the second imaging device 12. The unloading controller 1024 determines: (1) at least two points on a common visual axis that bisects the lenses of both the first imaging device 10 and the second imaging device 12, and (2) a linear spatial separation between the first imaging device 10 and the second imaging device 12, where the first field of view 77 (in FIG. 15A) of the first imaging device 10 and the second field of view 177 of the second imaging device 12 overlap, at least partially, to capture the spout 89, the spout end 87 and the container perimeter 81 in the collected image data.

System 2000 further comprises an optional odometrical sensor 440 (e.g., odometer), and an optional inertial sensor 442, as illustrated by the dashed lines in FIG. 12. The odometer sensor 440 may comprise a magnetic rotation sensor, a gear driven sensor, or a contactless sensor for measuring the rotation of one or more wheels of the transferring vehicle to estimate a distance traveled by the transferring vehicle during a measurement time period, or a ground speed of the transferring vehicle. The odometrical sensor 440 may be coupled to the vehicle data bus 60 or an implement data bus. The inertial sensor 442 may comprise one or more accelerometers, gyroscopes or other inertial devices coupled to the vehicle data bus 60 or an implement data bus. The optional odometrical sensor 440 and the optional inertial sensor 442 may augment or supplement position data or motion data provided by the first location-determining receiver 42.

Figure 15A:
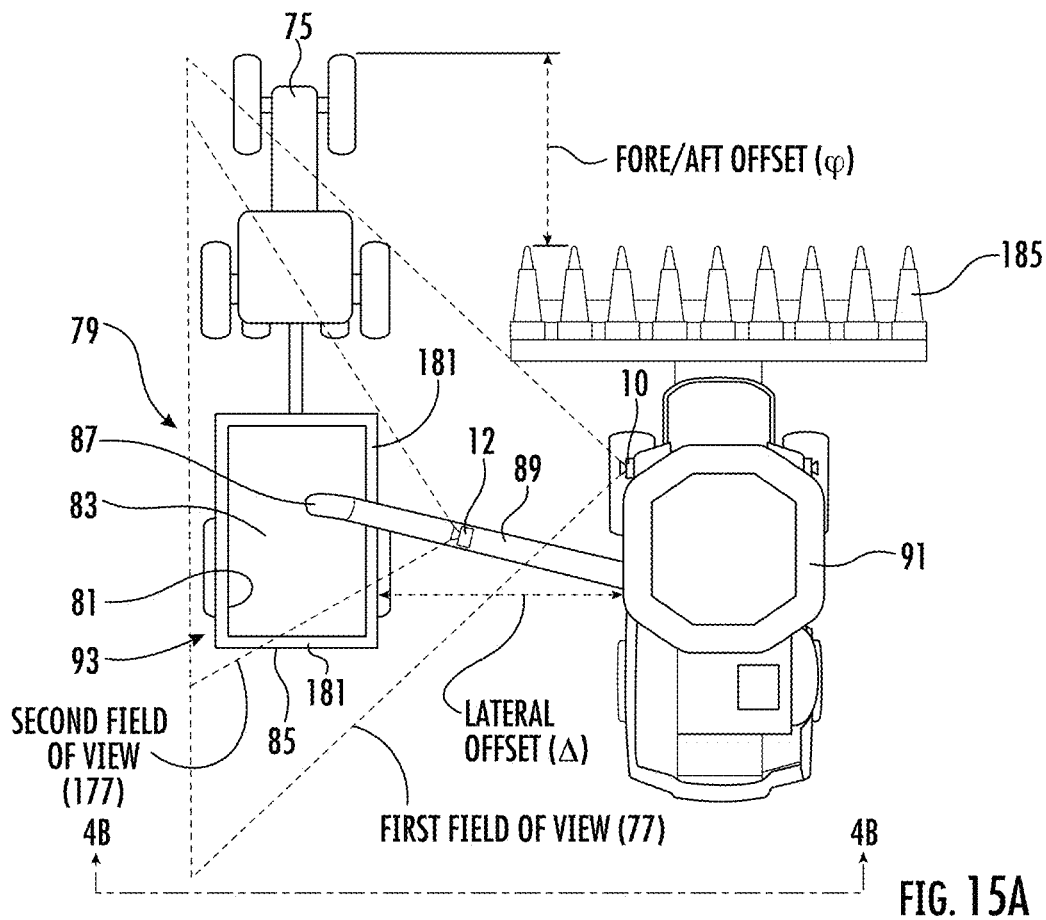
FIG. 15A illustrates a plan view of an imaging devices mounted on a transferring vehicle and facing toward a receiving vehicle.

The system 2000 of FIG. 12 is well suited for use on a combine or harvester as the transferring vehicle. The system 2000 of FIG. 12 may communicate and cooperate with a second system (311) on the receiving vehicle (e.g., as illustrated in FIG. 15A) to coordinate the relative alignment of the transferring vehicle and the receiving vehicle during unloading or transferring of material from the transferring vehicle.

The vision-augmented guidance system 1100 of FIG. 13 is similar to the system 2000 of FIG. 12; except that the system 1100 of FIG. 13 further comprises an implement data bus 58, a gateway 29, and vehicle controllers 50 coupled to the vehicle data bus 60 for the optional lights 14 and spout 56 (in FIG. 13). The vehicle controller 50 controls the lights 52; the spout controller 54 controls the spout 89 via one or more of the following: a rotation actuator 260, tilt actuator 262, or deflector actuator 264. A rotation actuator 260 may rotate the spout about a first axis that is generally perpendicular to the ground; a tilt actuator 262 may tilt or rotate the spout at an upward or downward angle along a second axis that may be generally parallel to the ground or substantially perpendicular to the first axis. The deflector actuator 264 may activate a deflector at or near a spout end 87 of the spout 89 to avoid overshooting or undershooting the container or storage area of the receiving vehicle with harvested material, for example. In one implementation, each of the rotation actuator 260, the tilt actuator 262, and the deflector actuator 264 may comprise a servo-motor, electric motor, or an electro-hydraulic mechanism for moving or adjusting the orientation or spout angle of the spout (89 in FIG. 16A or 56 in FIG. 13), or its spout end 87.

In one configuration, the spout controller 54 controls the spout 89 based on operator input or unloading controller 1024 based on sensor data from one or more of the following sensors: a rotation sensor 266, a tilt sensor 268, and a deflector sensor 270. A rotation sensor 260 measures a first angle of rotation of the spout about a first axis that is generally perpendicular to the ground; a tilt sensor 268 measures a second angle of rotation, or a tilt angle, of the spout at an upward or downward angle along a second axis that may be generally parallel to the ground or substantially perpendicular to the first axis. The deflector sensor 264 may measure a deflector angle or a deflector active status or inactive status at or near a spout end 87 of the spout (89 or 56) to avoid overshooting the container or storage area of a the receiving vehicle with harvested material, for example. In one implementation, each of the rotation sensor 266, and the tilt sensor 268 may comprise a magnetic field sensor, a Hall Effect sensor, a magnetostrictive sensor, a magnetoresistive sensor, a variable resistor, or another suitable sensor for measuring an angle between the spout 89 and the transferring vehicle, with respect to rotation along the first axis, the second axis, or otherwise. In one configuration, the deflector sensor 270 may comprise a contact sensor or contact switch to provide a status message or status signal indicative of whether the deflector is extended or retracted with respect to the spout end 87.

In one configuration, the implement data bus 58 may comprise a Controller Area Network (CAN) implement data bus. Similarly, the vehicle data bus 60 may comprise a controller area network (CAN) data bus. In an alternate implementation, the implement data bus 58, the vehicle data bus 60, or both may comprise an ISO (International Organization for Standardization) data bus or ISOBUS, Ethernet or another data protocol or communications standard.

The gateway 29 supports secure or controlled communications between the implement data bus 58 and the vehicle data bus 60. The gateway 29 comprises a firewall (e.g., hardware or software), a communications router, or another security device that may restrict or prevent a network element or device on the implement data bus 58 from communicating (e.g., unauthorized communication) with the vehicle data bus 60 or a network element or device on the vehicle data bus 60, unless the network element or device on the implement data bus 58 follows a certain security protocol, handshake, password and key, or another security measure. Further, in one implementation, the gateway 29 may encrypt communications to the vehicle data bus 60 and decrypt communications from the vehicle data bus 60 if a proper encryption key is entered, or if other security measures are satisfied. The gateway 29 may allow network devices on the implement data bus 58 that communicate via an open standard or third party hardware and software suppliers, whereas the network devices on the vehicle data bus 60 are solely provided by the manufacturer of the transferring vehicle (e.g., self-propelled forage harvester) or those authorized by the manufacturer.

In FIG. 13, a first location-determining receiver 42, a user interface 44, a user interface processing module 26, and the gateway 29 are coupled to the implement data bus 58, although in other implementations such elements or network devices may be connected to the vehicle data bus 60. Vehicle controller 50 and spout controller 54 are coupled to the vehicle data bus 60. In turn, the vehicle controller 50 and spout controller 54 are coupled, directly or indirectly, to optional lights 52 on the transferring vehicle and the spout 89 of the transferring vehicle (e.g., self-propelled forage harvester). Although the system of FIG. 13 is well suited for use or installation on a self-propelled forage harvester, the system of FIG. 13 may also be applied to combines, harvesters or other heavy equipment.

The system 2000 of FIG. 12 and the system 1100 of FIG. 13 apply to the transferring vehicle, whereas the system 1200 of FIG. 14A and FIG. 14B apply to the receiving vehicle. Like reference numbers in FIG. 12, FIG. 13, FIG. 14A, and FIG. 14B indicate like elements. As previously noted, the transferring vehicle may comprise a combine, harvester, self-propelled harvester, vehicle or heavy equipment that collects or harvests material for transfer to the receiving vehicle. In one implementation, the receiving vehicle may comprise a propelled portion (e.g., 75 in FIG. 15A) and a storage portion (e.g., 93 in FIG. 15A) for storing the material transferred from the transferring vehicle. The receiving vehicle may comprise the combination of a tractor and a grain cart or wagon, where the tractor is an illustrative example of the propelled portion 75 and where the grain cart is an illustrative example of the storage portion 93. Here, the system 1200 of FIG. 14A is presented as an image processing system 18 that is alternatively on the receiving vehicle, instead of the transferring vehicle as in FIG. 12 and FIG. 13. In contrast, FIG. 14B is configured to cooperate with the system (1000, 1100, or 1200) of FIG. 12 or FIG. 13 as will be described later in detail.

The system 1200 of FIG. 14A comprises the first imaging device 10, the unloading controller 1024, the user interface processing module 26, the gateway 29, a second location-determining receiver 142, a second wireless communications device 148, the slave/master controller 159 among other devices illustrated in FIG. 14. In one implementation, the first imaging device 10 is mounted on the propelled portion 75 (e.g., tractor) of the receiving vehicle facing backwards towards the storage portion 93 (e.g., cart) or container 85 (e.g., as illustrated in FIG. 16A). The second wireless communications device 148 (of the receiving vehicle) is adapted for communicating data with the first communications device 48 (of the transferring vehicle) of FIG. 12 or FIG. 13, for example. The second location-determining receiver 142 provides position data, location data, altitude, velocity, or acceleration data.

In one implementation, the unloading controller 1024 of system 1200 of FIG. 14A estimates the relative position of the transferring vehicle and the receiving vehicle, and the relative orientation of the spout end 87 (or spout position) to the storage portion 93 (or container position) to direct or control the steering system 30, braking system 34, and propulsion system 38 of the receiving vehicle via one or more controllers (32,36,40) to place the transferring vehicle and receiving vehicle in a target transferring position for transferring of material from the spout end 87 to the storage portion 93. For example, the target transferring position or cooperative alignment can refer to registration or alignment of the spout position and the container position (e.g., for one or more sampling time periods). Meanwhile, the transferring vehicle may be controlled (steering, velocity, and acceleration) by its own operator or the first location-determining receiver 42. For example, the system 311 or image processing system 18 identifies the spout end 87, or the boot or tip of the spout where the material exits the spout 89 and computes (through stereo correspondence, disparity or other image processing) the relative position of the spout end 87 to the storage portion 93, the container perimeter of the storage portion 93, a central zone of the storage portion 93.

In FIG. 14A, a steering controller 32 associated with a steering system 30 of the receiving vehicle can steer the propelled portion of the receiving vehicle in accordance with a cooperative alignment (e.g., suitable for efficient transferring of material from the transferring material to the receiving vehicle) based on location data and motion data from the first location-determining receiver 42 and the second location-determining receiver 142. With or without such location and motion data from one or more location-determining receivers (42, 142), the unloading controller 1024 can use image data to align the spout 89 or spout end 87 with the storage portion 93 or container perimeter 81 of the receiving vehicle by steering the propelled portion of the receiving vehicle to maintain the cooperative alignment for unloading or transferring material between the vehicles.

FIG. 14B provides a configuration in which the transferring vehicle and receiving vehicle operate in a leader-follower configuration with transferring vehicle in the lead role and the receiving vehicle in the following role, such that the receiving vehicle tracks or follows the heading and velocity (and optionally the acceleration) of the lead vehicle with a target spatial offset. In FIG. 14B, the unloading controller 1024 is only active on the transferring vehicle and is inactive or not present on the receiving vehicle. On the transferring vehicle, the imaging processing module 18 and first location-determining receiver 42 provide image guidance data (if available or if reliable) and first motion data (e.g., location, heading, velocity and acceleration), respectively, that are used by both the transferring vehicle and the receiving vehicle for guidance.

In one configuration, the image guidance data, the first motion data, or both is transmitted by the first wireless communications device 48 on the transferring vehicle to the second wireless communications device 148 on the receiving vehicle. On the receiving vehicle, the slave/master controller 159 receives the first motion data (and first location data) from the first location-determining receiver 42 on the transferring vehicle and second motion data (and second location data) from the second location-determining receiver 142 on the receiving vehicle. The slave/master controller 159 generates an error or control data for controlling the steering system 30, braking system 34, and propulsion system 38 of the receiving vehicle, where the error or control data is based on the difference between the first motion data and the second motion data (and the first location data and second location data).

In another configuration, the master/slave controller 59 on the transferring vehicle may send control signals or control data messages to the slave/master controller 159 on the receiving vehicle to control the steering system 30, braking system 34, or propulsion system 38 of the receiving vehicle to optimize the relative position of the spout end 87 to the storage portion 93 of the container, the target spatial separation between the vehicles, or to avoid an imminent collision between the vehicles. On the receiving vehicle, the slave/master controller 159 can operate in a slave mode or follower mode under the control of the master/slave controller 59. The auto-guidance module 155 and the coordination module 157 within the slave/master controller 159 provide guidance of the receiving vehicle, consistent with location data and a path plan, or with other guidance data or command data from the master/slave controller 59 to the transferring vehicle.

The second wireless communications device 148 is coupled to the vehicle data bus 60. In FIG. 14A or FIG. 14B, the system (1200, 1300) for a receiving vehicle can be used in conjunction with the system (1000 or 1100) of the transferring vehicle of FIG. 12 or FIG. 13. The wireless devices (48, 148) may exchange or communicate position data, relative position data, command data, or control data for controlling, adjusting or coordinating the position and orientation of the vehicles; more particularly, the position and the orientation of the spout 89 or spout end 87 over the opening 83 of the container 85. The communicated data between the wireless communications devices (48, 148) may comprise any of the following data: (1) position data or location data from either location-determining receiver (42 or 142), (2) command or guidance data from an unloading controller 1024 on the transferring vehicle or receiving vehicle, (3) command or guidance data from the master/slave controller 59 or coordination module 57, (4) command or guidance data from the slave/master controller 159 or coordination module 157 or (5) alignment data (e.g., relative position of the imaging devices, relative position of reference points on the vehicles, and relative alignment between the spout and container perimeter) from the alignment module 24. For example, the imaging processing module 18 or alignment module 24 may use first location data of a first location-determining receiver 42 and second location data of a second location-determining receiver 142 to determine a relative position or spatial offset between the two vehicles (or a relative position) of the first imaging device 10 and the second imaging device 12 and to determine a relative alignment between the spout and the container perimeter.

The system 1200 of FIG. 14A may support different configurations or combinations of electronic systems (e.g., pairs 1000 and 1200, 1100 and 1200, 1000 and 1300, and 1100 and 1300) at the transferring and receiving vehicles. In a first configuration, an imaging device 10 on the receiving vehicle may be used instead of, or with, one or more imaging devices (10, 12) on the transferring vehicle. In a second configuration, the system 1200 of FIG. 14A may provide collected image processing data from the receiving vehicle to the transferring vehicle via the transmission of the collected image processing data from the second wireless communications device 148 to the first wireless communications device 48. Here, in a second configuration, the collected imaging processing data from the receiving vehicle may be referred to as supplementary data, complementary image data, or additional image data. The additional image data may provide additional perspective or viewpoints that can supplement the image data collected by the transferring vehicle. For example, the additional image data may provide more accurate or supplement image data where the image data collected by the transferring vehicle is affected by moisture (e.g., on its lens), dust, poor ambient lighting, glare or reflections that do not similarly impair or impact the additional image data.

The optional odometrical sensor 440 may be coupled to the vehicle data bus 60 or the implement data bus 58. The inertial sensor 442 may comprise one or more accelerometers, gyroscopes or other inertial devices coupled to the vehicle data bus 60 or the implement data bus 60.

The distributed fill state sensors 149 (e.g., in FIG. 14A and FIG. 14B) may comprise optical level sensors (not shown) distributed at different height levels within or around the container 85, piezoelectric mass sensors distributed to measure mass of the agricultural material in different volumes or on different floor areas (e.g., of a false vertically movable floor) of the container 85, or piezoresistive mass sensors distributed to measure mass of the agricultural material in different volumes or on different floor areas of the container 85, for example.

FIG. 15A illustrates a plan view of a transferring vehicle 91 and a receiving vehicle 79. As illustrated in FIG. 15A for explanatory purposes, the transferring vehicle 91 is shown as a combine with a harvesting head 185, whereas the receiving vehicle 79 is shown as a tractor and a grain cart. More generally, the receiving vehicle 79 comprises the combination of a propulsion unit 75 and a storage unit 93 (e.g., a towed storage unit).

FIG. 15A shows a first imaging device 10 on the transferring vehicle (e.g., combine) and an optional second imaging device 12 on a spout 89 of the transferring vehicle 91. The spout 89 may also be referred to as an unloading auger. The spout end 87 may be referred to as a boot. The first imaging device 10 has a first field of view 77, indicated by the dashed lines. The boundaries of the fields of view (77, 177) are merely shown for illustrative purposes and will vary in actual practice. The second imaging device 12 has a second field of view 177, indicated by the dashed lines. In FIG. 15A, the spout 89, or the spout end 87, is generally aligned over a central zone or opening 83, central region or target area of the storage container 85 (of the receiving vehicle) for unloading material from the transferring vehicle to the receiving vehicle 79. The target area may be consistent with cooperative alignment where the spout position and the container position are registered or aligned. Similarly, the transferring vehicle 91 and the receiving vehicle 79 are aligned in position as shown, regardless of whether the vehicles move together in a forward motion (e.g., with coordinated or tracked vehicle headings) during harvesting, as is typical, or are stationary. During unloading, the master/slave controller 59 and slave/master controller 159 facilitate maintenance of a generally uniform spatial offset (e.g., a generally static offset that varies only within a target tolerance) between the vehicles (91, 79), subject to any incremental adjustment of the offset for uniform filling of the container 85. The master/slave controller 59 and slave/master controller 159 support maintenance of a uniform fore/aft offset ($\phi$ or $\varphi$) and a lateral offset ($\Delta$).

In one implementation the illustration in FIG. 15A, the second imaging device 12 may be mounted on the spout 89. The transferring vehicle 91 may be equipped with a spout angle sensor or rotation sensor 116 (e.g., rotary position sensor) to measure the rotation angle of the spout.

In an alternate implementation for a spout-mounted imaging device (e.g., second imaging device 12 on the spout as shown in FIG. 15A), the rotation angle of the spout 89 may be used to facilitate fusion of image data from the first imaging device 10 and the second imaging device 12, or to construct stereo image data where the first imaging device 10 and the second imaging device 12 individually provide monocular image data for the same scene or object.

In any arrangement of imaging devices (10, 12) disclosed herein where the fields of view (77, 177) overlap, data fusion of image data from a first imaging device 10 and a second imaging device 12 enables the unloading controller 1024 to create a virtual profile of the material distribution level inside the storage portion 93, even when the entire surface of the agricultural material is not visible to one of the two imaging devices (10, 12). Even if the second imaging device 12 is not mounted on the spout 89 in certain configurations, the spout angle sensor 116 may facilitate using the spout end 87 as a reference point in any collected image data (e.g., for fusion, virtual stitching or alignment of image data from different imaging devices.) The virtual profile of the entire surface of the agricultural material in the storage portion 93 enables the system (1000, 1100, or 1200/1300) or imaging module 18 to intelligently execute a fill strategy for the storage portion 93 of the receiving vehicle.

Figure 15B:
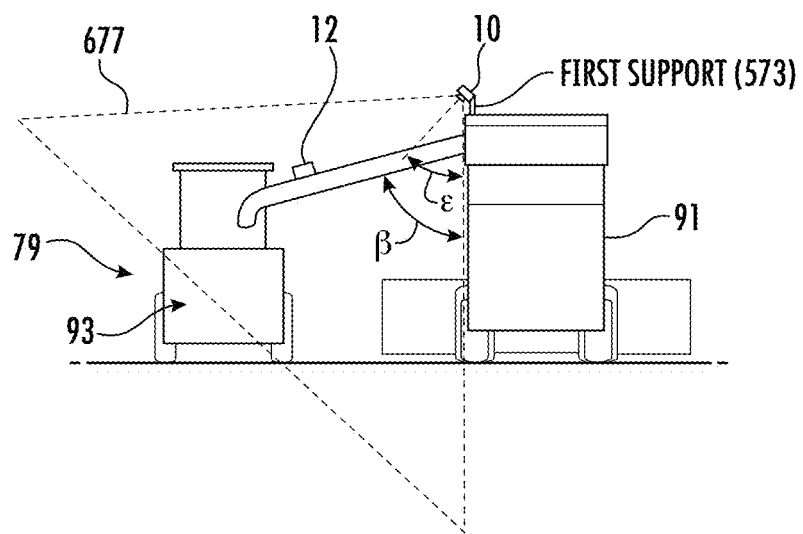
FIG. 15B illustrates a view in a horizontal plane as viewed along reference line 15B-15B in FIG. 15A.

In FIG. 15B, the first imaging device 10 and the second imaging device 12 are mounted on the transferring vehicle 91, where the first imaging device 10 is mounted on a first support or adjustable mast 573 (e.g., monopole with tilt or pan adjustment) to provide a first downward field of view 677 or a down-tilted field of view. As shown in FIG. 15B, the down-tilt angle ($\Sigma$) is measured with respect to a vertical axis. A tilt sensor on or in the imaging device 10, or associated with the mast-imaging device mounting hardware, may measure the down-tilt angle or the declination angle for reporting to the mast controller 674. For example, the tilt sensor may comprise one or more accelerometers, such as those that are commercially available for portable consumer electronic devices.

If the first imaging device 10 is elevated or mounted on the transferring vehicle 91 sufficiently high with respect to the storage portion 93, the first imaging device 10 will have visibility or downward field of view 677 into the storage portion 93 or container 85 sufficient to observe and profile the surface (or height (z) versus respective x, y coordinates in the container) of the agricultural material (e.g., grain) as the agricultural material fills the storage portion 93. The first imaging device 10 may be mounted on the roof of the transferring vehicle 91 facing or looking directly away from the side of the transferring vehicle with the spout 89 for unloading agricultural material.

If the first imaging device 10 is further from the storage portion 93 or container 85 than the second imaging device 12 during unloading of the agricultural material, the first imaging device 10 can have suitable view of the storage portion 93 (e.g., grain cart) to facilitate easier tracking of the relative position of the storage portion 93 to the transferring vehicle 91.

In one illustrative configuration, consistent with the downward field of view (677) the optical axes, perpendicular to respective lens, of the first imaging device 10, the second imaging device 12, or both are tilted downward from generally horizontal plane at a down-tilted angle (c) (e.g., approximately 60 to 85 degrees downward from the vertical axis as shown in FIG. 15B or approximately 10 to 25 degrees downward from a horizontal axis or horizontal plane). If a field of view or optical axis of the imaging device (10, 12) is tilted downward from a generally horizontal plane, there are several advantages.

First, less of the sky is visible in the field of view of the imaging device (10, 12) such the collected image data tends to have a more uniform image intensity profile. The tilted configuration of the optical axis or axes (which are perpendicular to the lenses of the imaging devices (10, 12) is well suited for mitigating the potential dynamic range issues caused by bright sunlight or intermediate cloud cover, for instance. In one implementation, the imaging device (e.g., 10) is mounted with a down-tilt angle to avoid washout of, corruption of, or interference with collected image data during a transient exposure time period to sunlight, a reflection or a light source that exceeds a threshold brightness level for a material portion of the pixels in the collected image data.

Second, the bottom part of the storage portion 93 becomes more visible in the image data to enable the recording of the image data related to one or more wheels of the storage portion 93. The wheel is a feature on the storage portion 93 that can be robustly tracked by image processing techniques. Third, tilting the stereo camera down may mitigate the accumulation of dust and other debris on the lens or external window of the imaging device (10, 12).

FIG. 16A illustrates a plan view of a transferring vehicle and a receiving vehicle. Like reference numbers indicate like elements in FIG. 16A and FIG. 15. FIG. 15A shows a first imaging device 10 on the rear of the propulsion unit 75 (e.g., tractor) or the receiving vehicle 79. The first imaging device 10 has a first field of view 277 indicated by the dashed lines. In FIG. 16A, the spout 89 or spout end 87 is generally aligned over a central zone or opening 83, central region or target area of the storage unit 93 or container 85 for unloading material from the transferring vehicle 91 to the receiving vehicle 79. Similarly, the transferring vehicle 91 and the receiving vehicle 79 are aligned in position as shown, and even as the vehicles (79, 91) move with coordinated headings or generally parallel headings and with no or minimal relative velocity with respect to each other.

In an alternative implementation of FIG. 16A, an optional second imaging device 12 may be mounted on the vehicle with a second field of view, which may be slightly offset from, overlapped with, or aligned with the first field of view 277 to provide redundancy should the first imaging device 10 fail, malfunction, be unavailable, be unreliable, or provide poor quality image data. For example, the first imaging device 10 may not operate reliably where it is obscured by dust, fog, salt, or air-born contaminants, or where it is exposed to inadequate ambient light conditions or excessive glare from sunlight or reflected light. In FIG. 16A, the unloading controller 1024 can estimate the distance or range from the first imaging device 10, the second imaging device 12, or both to an object in the image, such as the spout 89, the spout end 87, the container perimeter 81, the level or profile of agricultural material in the container 85 (e.g., at various positions or coordinates within the container 85).

Figure 16B:
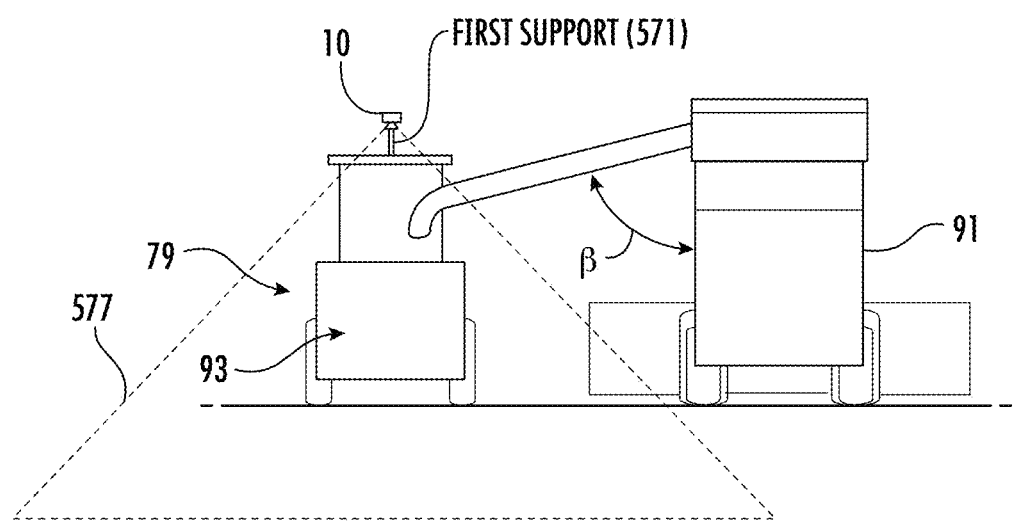
FIG. 16B illustrates a view in a horizontal plane as viewed along reference line 16B-16B in FIG. 16A.
Figure 16C:
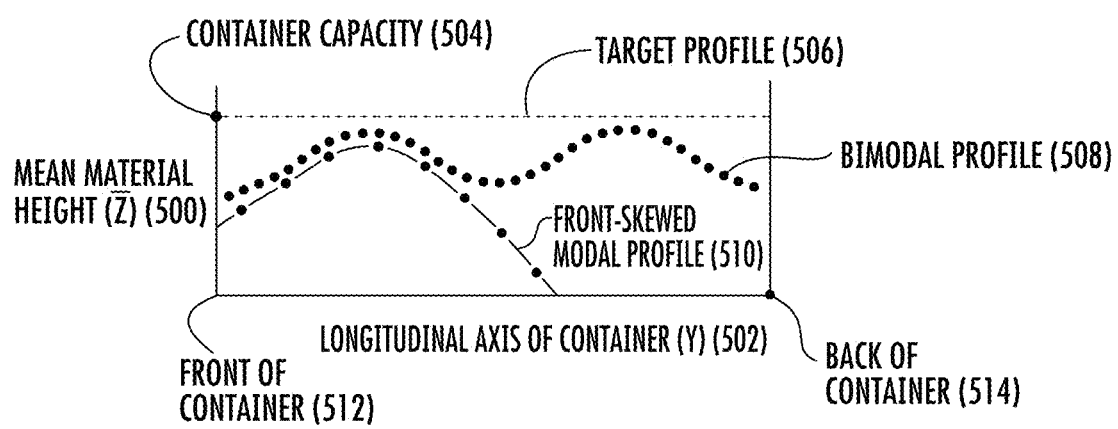
FIG. 16C illustrates a two-dimensional representation of various possible illustrative distributions of material in the interior of a container or storage portion, consistent with a cross-sectional view along reference line 16D-16D in FIG. 16B.

FIG. 16B illustrates a view in a horizontal plane as viewed along reference line 16B-16B in FIG. 16A. In one implementation, the first imaging device 10 is mounted on the receiving vehicle 79 on a first support 571 (e.g., monopole with tilt or pan adjustment) to provide a first downward field of view 577 or a first down-tilted field of view.

In an alternate implementation, the first support 571 comprises an adjustable mast or telescopic mast that is controlled by a mast controller (674) to remotely adjust the height, tilt angle, down-tilt angle, declination angle, rotation angle, or pan angle to provide reliable image data for processing by the unloading controller 1024. The down-tilt angle or declination angle may be measured with respect to a horizontal axis or horizontal plane that is perpendicular to a vertical axis. At or near a top or top segment of the mast, a movable or adjustable shelf, a movable or adjustable mounting bracket or other movable mounting arrangement secures the imaging device 10 to the first support or mast.

If the first imaging device 10 is elevated or mounted on the receiving vehicle 79 sufficiently high with respect to the storage portion 93, the first imaging device 10 will have visibility or first downward field of view 577 into the storage portion 93 or container 85 sufficient to observe and profile the surface (or height (z) versus respective x, y coordinates in the container) of the agricultural material (e.g., grain) as the agricultural material fills the storage portion 93. The first imaging device 10 may be mounted on the roof or cab of the receiving vehicle 79 (or its propulsion unit 75) facing or looking directly away from the side of the transferring vehicle with the spout 89 for unloading agricultural material.

In one illustrative configuration, consistent with the downward field of view 577 the optical axes, perpendicular to respective lens, of the first imaging device 10 is tilted downward from generally horizontal plane at a down-tilted angle (e.g., approximately 10 to 25 degrees downward from the horizontal plane or horizontal axis). If a field of view or optical axis of the imaging device 10 is tilted downward from a generally horizontal plane, there are several advantages. First, less of the sky is visible in the field of view of the imaging device 10 such the collected image data tends to have a more uniform image intensity profile. The tilted configuration of the optical axis (which are perpendicular to the lenses of the imaging devices 10 is well suited for mitigating the potential dynamic range issues caused by bright sunlight or intermediate cloud cover, for instance. Second, the bottom part of the storage portion 93 becomes more visible in the image data to enable the recording of the image data related to one or more wheels of the storage portion 93. The wheel is a feature on the storage portion 93 that can be robustly tracked by image processing techniques. Third, tilting the stereo camera down may mitigate the accumulation of dust and other debris on the lens or external window of the imaging device 10.

FIG. 16C illustrates a two-dimensional representation of various possible illustrative distributions of material in the container 85, consistent with a view along reference line 16C-16C in FIG. 16A. In one configuration, the y axis is coincident with the longitudinal axis or direction of travel of the container, the z axis is coincident with the height of material in the container, and the x axis is perpendicular to the direction of travel of the container, where the x, y and z axes are generally mutually orthogonal to each other.

In the chart of FIG. 16C, the vertical axis is the mean height (z) 500 of the material in the container 85; the horizontal axis represents the longitudinal axis (y) 502 of the container 85. The maximum capacity 505 or container capacity is indicated by the dashed line on the vertical axis. The front 512 of the container 85 is located at the origin, whereas the back 514 of the container 85 is located on the vertical axis.

FIG. 16C shows three illustrative distributions of material within the container 85. The first distribution is a bimodal profile 508 in which there are two main peaks in the distribution of material in the container 85. The bimodal profile 508 is shown as a dotted line. The bimodal profile 508 can occur where the spout angle adjustment is governed by an electro-hydraulic system with non-proportional valves.

The second distribution is the front-skewed modal profile 510 in which there is single peak of material toward the front of the container 85. The front-skewed modal profile 510 is shown as alternating long and short dashes. The second distribution may occur where the volume or length (y) of the container 85 is greater than a minimum threshold and where the relative alignment between the spout end 87 and the container 85 is generally stationary during a substantial portion of unloading of the material.

The third distribution is the target profile 508 which may be achieved by following a suitable fill strategy as disclosed in this document. For example, during unloading, the spout angle may be adjusted to promote uniform distribution of the agricultural material in the container 85. Further, the lateral offset ($\Delta$) or fore/aft offset ($\phi$ or $\varphi$) between the vehicles (79, 91) may be adjusted in accordance with a matrix (e.g., x, y coordinate matrix of equidistant point locations of the transferring vehicle relative to a constantly spaced position point of the receiving vehicle) of relative unloading positions, particularly for longer or wider containers that cannot be uniformly filled from a single, relative unloading point between the vehicles (79, 91).

Figure 16D:
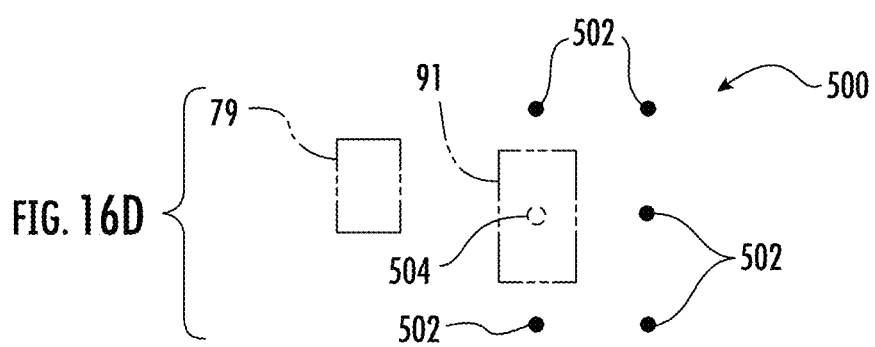
FIG. 16D is a plan view of a transferring vehicle and a receiving vehicle, where the transferring vehicle is aligned within a matrix of possible offset positions.

FIG. 16D is a plan view of a transferring vehicle 91 and a receiving vehicle 79, where the transferring vehicle 91 is aligned within a matrix 500 of possible offset positions (502, 504) between the transferring and receiving vehicle 79. Each offset position (502, 504) may be defined in terms of a combination of a unique lateral offset ($\Delta$) and a unique fore/aft offset ($\phi$ or $\varphi$) between the vehicles (79, 91). As shown, the matrix 500 is a two-dimensional, 2×3 (2 columns by 3 rows) matrix of possible offset positions (502, 504). Although six possible matrix positions (502, 504) are shown, in alternate implementations the matrix 500 may consistent of any number of possible offset positions greater than or equal to two. Here, the transferring vehicle 91 occupies a current offset position 504 in the first column at the second row of the matrix 500, whereas the other possible offset positions 502 are not occupied by the transferring vehicle 91. As directed by any of the systems (11, 111, 311), the imaging processing module 18, or the master/slave controller 59 of the transferring vehicle 91 or the receiving vehicle 79 can shift to any unoccupied or other possible offset positions 502 within the matrix 500 to promote or facilitate an even distribution of agricultural material within the container 85 or storage portion of the receiving vehicle 79. The spatial offset between the transferring vehicle 91 and the receiving vehicle 79 may be adjusted in accordance with the matrix 500 or another matrix of preset positions of spatial offset to promote even distribution of agricultural material in the storage portion of the receiving vehicle 79, where any matrix is associated with a unique, relative lateral offset ($\Delta$) and fore/aft offset ($\phi$ or $\varphi$) between the vehicles (79, 91).

In one implementation of FIG. 5D, both the transferring vehicle 91 and the receiving vehicle 79 may be moving forward at approximately the same velocity and heading (e.g., within a tolerance or error of the control systems during harvesting), where the relative position of the receiving vehicle 79 is generally fixed or constant with respect to each position (502, 504) in the matrix 500 that the transferring vehicle 91 can occupy.

In an alternate implementation, the receiving vehicle 79 may be shown as occupying a two dimensional matrix (e.g., 3×3 matrix, with three columns and three rows) of possible offset positions, while the position of the transferring vehicle 91 is generally fixed or constant with respect to each position of matrix that the receiving vehicle 79 could occupy. As directed by any of the systems (1000, 1100, 1200) in the alternate implementation, the imaging processing module 18, or the master/slave/master controller 159 of the receiving vehicle 79 can shift to any unoccupied or other possible offset positions within the matrix to promote or facilitate an even distribution of agricultural material within the container 85 or storage portion of the receiving vehicle 79.

In FIG. 17A through 18D, inclusive, each of the blocks or modules may represent software modules, electronic modules, or both. Software modules may contain software instructions, subroutines, object-oriented code, or other software content. The arrows that interconnect the blocks or modules of FIG. 17A through FIG. 18D, inclusive, show the flow of data or information between the blocks. The arrows may represent physical communication paths or virtual communication paths, or both. Physical communication paths mean transmission lines or one or more data buses for transmitting, receiving or communicating data. Virtual communication paths mean communication of data, software or data messages between modules.

Figure 17A:
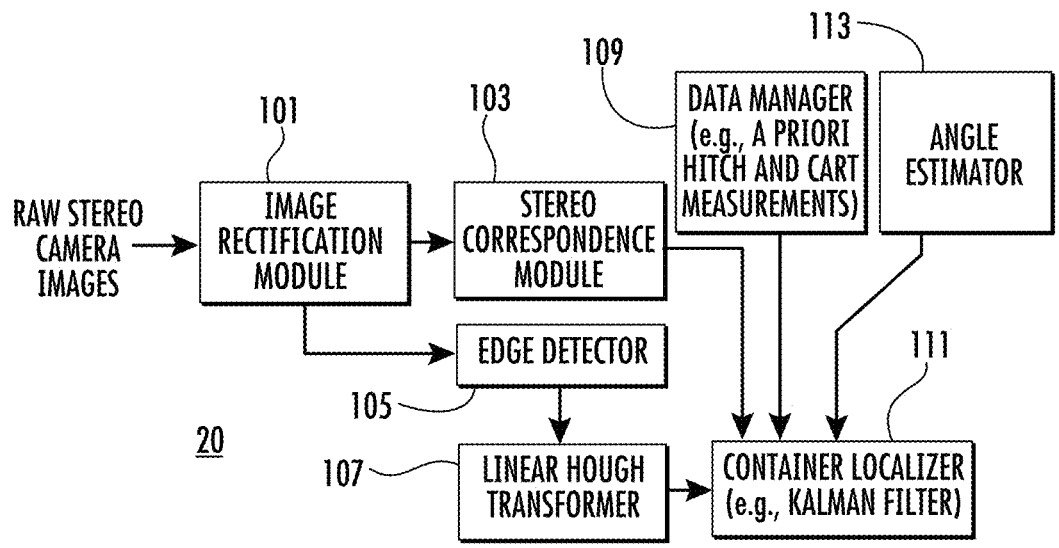
FIG. 17A illustrates a block diagram of an example container module or a section of an image processing module.

FIG. 17A is a block diagram that shows the imaging processing module 18 and the container module 20 in greater detail than FIG. 12. Like reference numbers in FIG. 12, FIG. 17A, FIG. 17B, FIG. 18A, FIG. 18B and FIG. 18C indicate like elements. As illustrated in FIG. 17A, the first imaging device 10, the second imaging devices 12, or both, provide input of raw stereo camera images (or raw image data) to the image rectification module 101. In turn, the image rectification module 101 communicates with the stereo correspondence module 103 and the edge detector 105. The edge detector 105 provides an output to the linear Hough transformer 107. The outputs of the stereo correspondence module 103 and the linear Hough transformer 107 are provided to the container localizer 111. The container localizer 111 may access or receive stored (a priori) hitch and container measurements, container dimensions, container volume or other receiving vehicle data from the data manager 109. In one implementation, the container localizer 111 may receive or access and an estimate of the tongue angle (between the propulsion portion 75 and the storage portion 93 of the receiving vehicle 79) from the angle estimator 113 and stored hitch and container measurements.

Although the image rectification module 101 is shown as part of the container module 20, in an alternate implementation, the image rectification module 101 or image rectifier may be incorporated into the first imaging device 10, the second imaging device 12, or both. In the another implementation, the image rectification module 101 (in the unloading controller 1024 or in the imaging device (10, 12)) provides image processing to the collected image data or raw stereo images to reduce or remove radial lens distortion and image alignment required for stereo correspondence. The radial lens distortion is associated with the radial lenses of the first imaging device 10, the second imaging device 12, or both. The input of the image rectification module 101 is raw stereo image data, whereas the output of the image rectification module 101 is rectified stereo image data.

In one illustrative implementation, the image rectification module 101 eliminates or reduces any vertical offset or differential between a pair of stereo images of the same scene of the image data. Further, the image rectification module can align the horizontal component (or horizontal lines of pixels of the stereo images) to be parallel to the scan lines or common reference axis of each imaging device (e.g., left and right imaging device) within the first and second imaging devices (10, 12). For example, the image rectification module can remap pixels from initial coordinates to revised coordinates for the right image, left image or both to achieve registration of the images or rectified right and left images of the stereo image. The rectified image supports efficient processing and ready identification of corresponding pixels or objects within the image in the left image and right image of a common scene for subsequent image processing (e.g., by the stereo corresponding module 103).

In one configuration, the stereo correspondence module 103 applies a stereo matching algorithm or disparity calculator to collected stereo image data, such as the rectified stereo image data outputted by the image rectification module 101. The stereo matching algorithm or disparity calculator may comprise a sum of absolute differences algorithm, a sum of squared differences algorithm, a consensus algorithm, or another algorithm to determine the difference or disparity for each set of corresponding pixels in the right and left image (e.g., along a horizontal axis of the images or parallel thereto).

In an illustrative sum of the absolute differences procedure, the right and left images (or blocks of image data or rows in image data) can be shifted to align corresponding pixels in the right and left image. The stereo matching algorithm or disparity calculator determines a disparity value between corresponding pixels in the left and right images of the image data. For instance, to estimate the disparity value, each first pixel intensity value of a first subject pixel and a first sum of the first surrounding pixel intensity values (e.g., in a block or matrix of pixels) around the first pixel is compared to each corresponding second pixel intensity value of second subject pixel and a second sum of the second surrounding pixel intensity values (e.g., in a block or matrix of pixels) around the second pixel. The disparity values can be used to form a disparity map or image for the corresponding right and left image data.

The unloading controller 1024, or container localizer 111, estimate a distance or range from the first imaging device 10, the second imaging device 12, or both to the pixels or points lying on the container perimeter 81, on the container edge 181, on the spout 89, on the spout end 87, or on any other linear edge, curve, ellipse, circle or object identified by the edge detector 105, the linear Hough transformer 107, or both. For example, the unloading controller 1024 may use the disparity map or image to estimate a distance or range from the first imaging device 10, the second imaging device 12, or both to the pixels or points lying on the container perimeter 81, the container edges 181, the container opening 83, in the vicinity of any of the foregoing items, or elsewhere.

Although the stereo correspondence module 103 is illustrated as part of the container module 20, in an alternate implementation the stereo correspondence module 103 may comprise a separate module within the image processing system 18 or a disparity module, for example.

In one implementation, the container module 20 comprises: (1) an edge detector 105 for measuring the strength or reliability of one or more edges 181, or points on the container perimeter 81 in the image data; (2) a linear Hough transformer 107 for identifying an angle and offset of candidate linear segments in the image data with respect to a reference point on an optical axis, reference axis of the one or more imaging devices (10, 12); (3) a container localizer 111 adapted to use spatial and angular constraints to eliminate candidate linear segments that cannot logically or possibly form part of the identified linear segments of the container perimeter 81, or points on the container perimeter 81; and (4) the container localizer 111 transforms the non-eliminated, identified linear segments, or identified points, into two or three dimensional coordinates relative to a reference point or reference frame of the receiving vehicle and harvesting vehicle.

The edge detector 105 may apply an edge detection algorithm to rectified image data from the image rectification module 101. Any number of suitable edge detection algorithms can be used by the edge detector 105. Edge detection refers to the process of identifying and locating discontinuities between pixels in an image or collected image data. For example, the discontinuities may represent material changes in pixel intensity or pixel color which defines boundaries of objects in an image. A gradient technique of edge detection may be implemented by filtering image data to return different pixel values in first regions of greater discontinuities or gradients than in second regions with lesser discontinuities or gradients. For example, the gradient technique detects the edges of an object by estimating the maximum and minimum of the first derivative of the pixel intensity of the image data. The Laplacian technique detects the edges of an object in an image by searching for zero crossings in the second derivative of the pixel intensity image. Further examples of suitable edge detection algorithms include, but are not limited to, Roberts, Sobel, and Canny, as are known to those of ordinary skill in the art. The edge detector 105 may provide a numerical output, signal output, or symbol, indicative of the strength or reliability of the edges 181 in field. For example, the edge detector may provide a numerical value or edge strength indicator within a range or scale or relative strength or reliability to the linear Hough transformer 107.

The linear Hough transformer 107 receives edge data (e.g., an edge strength indicator) related to the receiving vehicle and identifies the estimated angle and offset of the strong line segments, curved segments or generally linear edges (e.g., of the container 85, the spout 89, the spout end 87 and opening 83) in the image data. The estimated angle is associated with the angle or compound angle (e.g., multidimensional angle) from a linear axis that intercepts the lenses of the first imaging device 10, the second image device 12, or both. The linear Hough transformer 107 comprises a feature extractor for identifying line segments of objects with certain shapes from the image data. For example, the linear Hough transformer 107 identifies line equation parameters or ellipse equation parameters of objects in the image data from the edge data outputted by the edge detector 105, or Hough transformer 107 classifies the edge data as a line segment, an ellipse, or a circle. Thus, it is possible to detect containers or spouts with generally linear, rectangular, elliptical or circular features.

In one implementation, the data manager 109 supports entry or selection of container reference data by the user interface 44. The data manager 109 supports entry, retrieval, and storage of container reference data, such as measurements of cart dimensions, by the unloading controller 1024 to give spatial constraints to the container localizer 111 on the line segments or data points that are potential edges 181 of the cart opening 83.

In one implementation, the angle estimator 113 estimates the angle of the storage portion 93 (e.g., cart) of the receiving vehicle 79 to the axis of the direction of travel of the propelled portion 75 (e.g., tractor) of the receiving vehicle 79. The angle estimator 113 provides angular constraints to the container localizer 111 on the lines, or data points, that are potential edges 181 of the container opening 83. In configuration, the angle estimator 113 is coupled to the localizer 111 (e.g., container localizer or Kalman filter). The angle estimator filter 113 outputs, or is capable of providing, the received estimated angle of the storage portion 93 relative to the axis of the direction of travel of the propelling portion 75 of the vehicle.

The localizer 111 is adapted to receive measurements of dimensions of the container perimeter 81 or the storage portion 93 of the vehicle to facilitate identification of candidate linear segments that qualify as identified linear segments of the container perimeter 81. In one implementation, the localizer 111 is adapted to receive an estimated angle of the storage portion 93 relative to the propelling portion 75 of the vehicle to facilitate identification of candidate linear segments that qualify as identified linear segments of the container perimeter 81. The localizer 111 uses spatial and angular constraints to eliminate candidate lines in the image data that cannot be possibly or logically part of the container opening 83 or container edges 181, then selects preferential lines (or data points on the container edge 181) as the most likely candidates for valid container opening 83 (material therein) or container edges 181. The localizer 111 characterizes the preferential lines as, or transformed them into, three dimensional coordinates relative to the vehicle or another frame of reference to represent a container perimeter of the container 85.

Figure 17B:
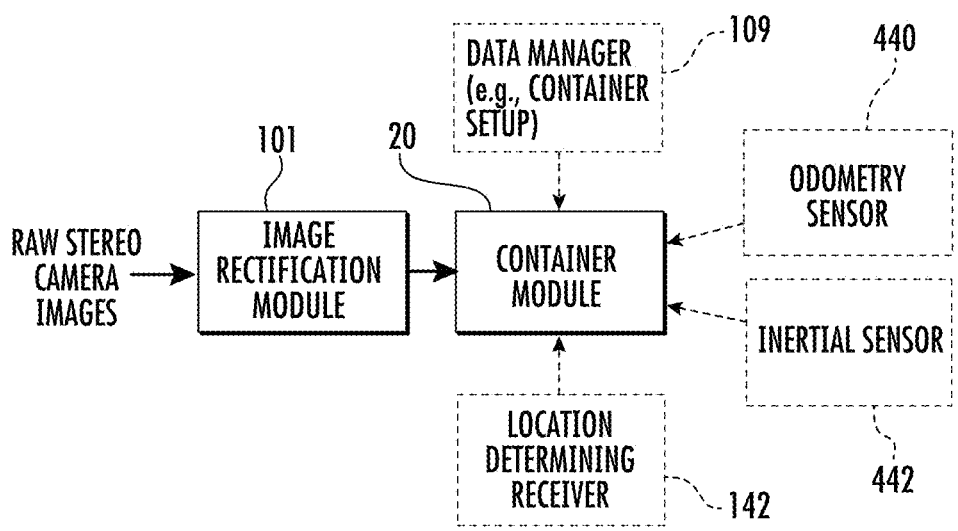
FIG. 17B illustrates a block diagram of an example container module or a section of an image processing module.

FIG. 17B illustrates an image rectification module 101 or image rectifier that may reside in the imaging device 10. The image rectification module 101 provides a rectified stereo image to the container module 20 for processing. As shown, the container module 20 may receive input data from one or more of the following sources on the receiving vehicle: data manager (e.g., container setup module) 109, odometry sensor 440, inertial sensor 442, second location-determining receiver 142, or an angle sensor (not shown). A tongue angle sensor, which can be coupled to data bus 60, provides sensor data indicative of a trailer tongue angle or hitch angle at a pivot point between the propulsion portion and the storage portion of the receiving vehicle. The container module 20 uses the input data to estimate a container position or its container perimeter. As used in this document, the container position may comprise any point, reference point, or three-dimensional coordinates on or for the container, storage portion, or receiving vehicle.

The data manager 109 stores input data or a priori information data inputted by the user via the user interface 44 on the hitch dimensions and cart dimensions. The container module 20 is adapted to determine the container position by processing one or more of the following input data: (a) sensor data indicative of a trailer tongue angle between the propulsion portion and the storage portion of the receiving vehicle, (b) a heading of the propelled portion, (c) a position (e.g., leading position) of the propelled portion; (d) a position (e.g., trailing position) of the storage portion, and (e) physical vehicle data associated with one or more dimensions of the storage portion, such as the distance between a pivot point of the trailer tongue and wheelbase, and (f) kinematic model data associated with the movement of the storage portion with respect to the propulsion unit. The unloading controller 1024 may use, retrieve or access previously stored data, such as dimensional parameters related to the receiving vehicle, the dimensional parameters comprising a distance between a trailer hitch and front wheel rotational axis of the storage portion 93. Such dimensional parameters may be entered via a user interface 44 coupled to the vehicle data bus 60 or the unloading controller 1024, for example.

Figure 17C:
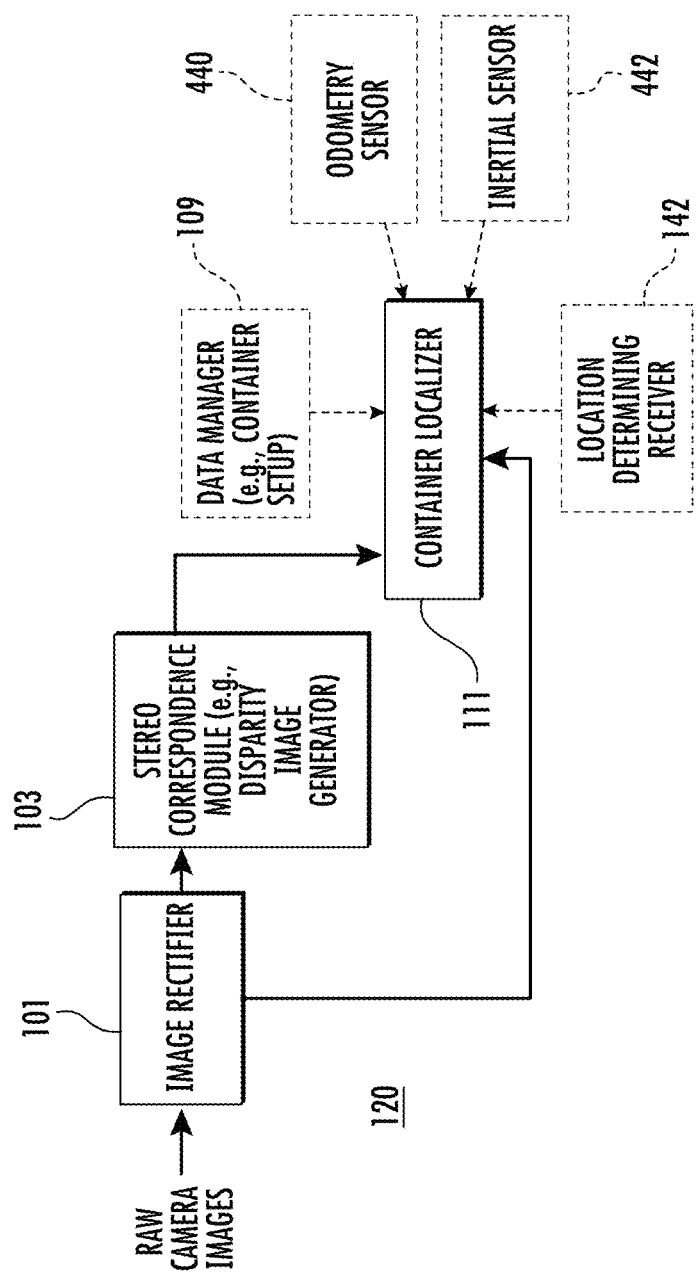
FIG. 17C illustrates a block diagram of yet another example of a container module.

The container module 120 of FIG. 17C is similar to the container module 20 of FIG. 17B, except FIG. 17C further includes a stereo correspondence module 103 (e.g., disparity image generator) coupled between an output of the image rectifier 101 and the input of a container identification module 111. Like reference numbers in FIG. 17B and FIG. 17C indicate like elements. The container module 120 can be substituted for the container module 20 of FIG. 12 through FIG. 14A, inclusive.

The container identification module 111 identifies the container position or the container perimeter based on by processing one or more of the following input data: (a) sensor data indicative of a trailer tongue angle between the propulsion portion and the storage portion of the receiving vehicle, (b) a heading of the propelled portion, (c) a position (e.g., leading position) of the propelled portion; (d) a position (e.g., trailing position) of the storage portion, and (e) physical vehicle data associated with one or more dimensions of the storage portion, such as the distance between a pivot point of the trailer tongue and wheelbase, and (f) kinematic model data associated with the movement of the storage portion with respect to the propulsion unit. One or more of the following sensors can provide the above input data to the container identification module: data manager (e.g., container setup module) 109, odometrical sensor 440, inertial sensor 442, second location-determining receiver 142, or a tongue angle sensor (not shown).

Figure 18A:
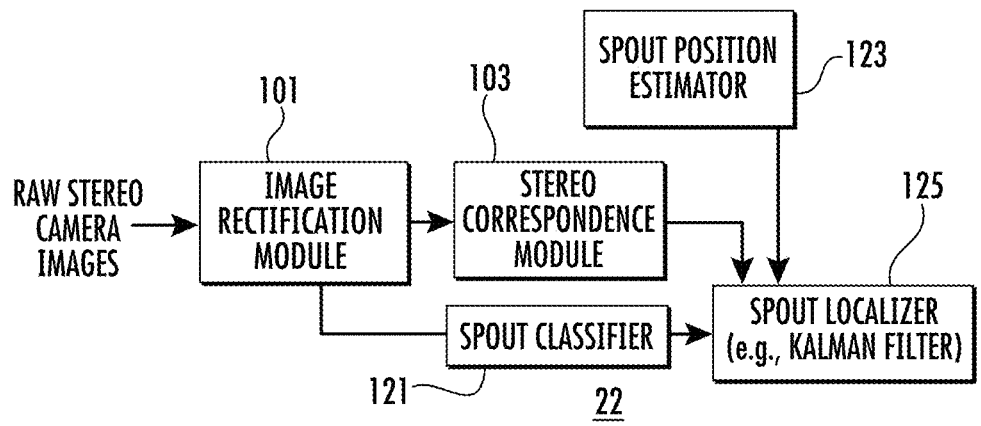
FIG. 18A is a block diagram of an example of a spout module or a section of an image processing module.

FIG. 18A is a block diagram that shows the unloading controller 1024 and the spout module 22 in greater detail than FIG. 12. Like reference numbers in FIG. 12, FIG. 17, FIG. 18A, FIG. 18B indicate like elements. In FIG. 18A, the image rectification module 101 communicates with the stereo correspondence module 103 and the spout classifier 121. In turn, the spout classifier 121 provides an output to the spout localizer 125. The spout localizer 125 accesses or receives the spout position from angle sensor 115 or the spout position estimator 123 (or spout angle (.alpha.) with respect to the transferring vehicle direction of travel or vehicle reference frame), stereo correspondence data from the stereo correspondence module 103, and the output data from the spout classifier 121.

Although the image rectification module 101 is shown as part of the spout module 22, in an alternate implementation, the image rectification module 101 or image rectifier may be incorporated into the first imaging device 10, the second imaging device 12, or both.

Although the stereo correspondence module 103 is illustrated as part of the spout module 22, in an alternate implementation the stereo correspondence module 103 may comprise a separate module within the image processing system 18 or a disparity module, for example.

In one implementation, the spout module 22 comprises a spout classifier 121 that is configured to identify candidate pixels in the image data based at least one of reflectivity, intensity, color or texture features of the image data (or pixels), of the rectified image data or raw image data, where the candidate pixels represent a portion of the spout 89 or spout end 87.

In one configuration, the spout localizer 125 is adapted to estimate a relative position of the spout 89 to the imaging device based on the classified, identified candidate pixels of a portion of the spout 89 or other image processing of the unloading controller 1024. In another configuration, the spout localizer 125 estimates a relative position of the spout 89 or the spout end 87 based on the following: (1)(a) rotation angle data from the rotation sensor (216 or 266), or (1)(b) a combination of a rotation angle or spout angle (.alpha.) from the rotation angle (216 or 266) and a tilt angle from a tilt sensor 268, and (2) a length of the spout 89 from the rotational axis about which the spout 89 rotates. The spout localizer 125 can estimate a combine spout position of the spout end 87 or spout angle (.alpha.) relative to the mounting location of the imaging device, or optical axis, or reference axis of one or more imaging devices, based on previous measurements to provide constraint data on where the spout 89 can be located possibly.

The spout classifier 121 applies or includes software instructions on an algorithm that identifies candidate pixels that are likely part of the spout 89 or spout end 87 based on expected color and texture features within the processed or raw image data. For example, in one configuration the spout end 87 may be painted, coated, labeled or marked with a coating or pattern of greater optical or infra-red reflectivity, intensity, or luminance than a remaining portion of the spout 89 or the transferring vehicle. The greater luminance, intensity or reflectivity of the spout end 87 (or associated spout pixels of the image data versus background pixels) may be attained by painting or coating the spout end 87 with white, yellow, chrome or a lighter hue or shade with respect to the remainder of the spout 89 or portions of the transferring vehicle (within the field of view of the imaging devices (10, 12).

In one implementation, the spout position estimator 123 receives input of previous measurements and container reference data and outputs an estimate of the spout position, spout angle, or its associated error. The spout position estimator 123 provides an estimate of the combine spout position, or spout angle, or its error, relative to one or more of the following: (1) the mounting location or pivot point of the spout on the transferring vehicle, or (2) the optical axis or other reference axis or point of the first imaging device 10, the second imaging device 12, or both, or (3) the axis associated with the forward direction of travel or the heading of the transferring vehicle. In one implementation, the spout position estimator 123 is coupled to the spout localizer 125.

In one implementation, the spout localizer 125 comprises a Kalman filter. The Kalman filter outputs constraints on where the spout 89 or spout end 87 can be located, an estimated spout position, or a spout location zone or estimated spout position zone. The spout localizer 125 takes pixels that are classified as belonging to the combine auger spout 89 and uses a disparity image (from stereo correspondence data) to estimate the relative location of the spout to the first imaging device 10, the second imaging device 12, or both, or reference axis or coordinate system associated with the vehicle.

Figure 18B:
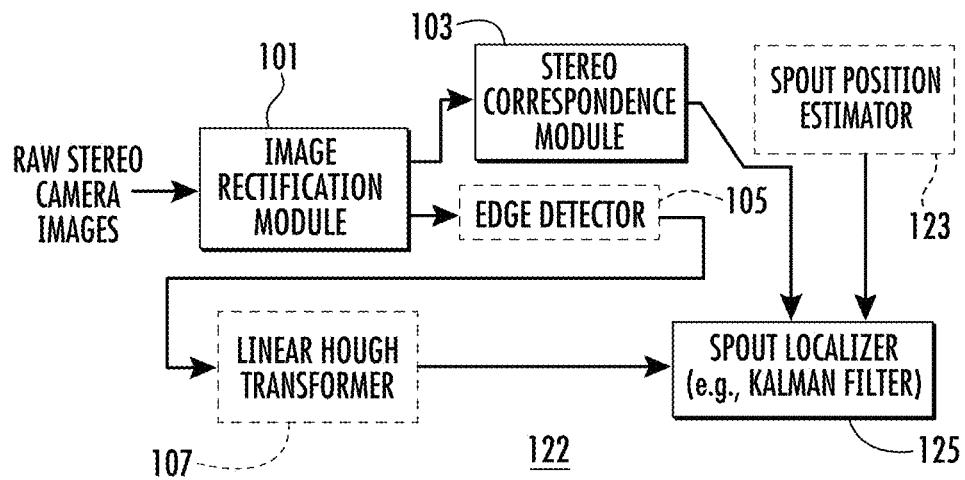
FIG. 18B is a block diagram of an example of a spout module or an image processing module.

FIG. 18B illustrates an alternative configuration of the spout module 22. Spout module 122 is similar to spout module 22 of FIG. 18A, except spout module 22 incorporates some components or blocks that are similar to those in FIG. 17. Like reference numbers indicate like elements in FIG. 12, FIG. 17, FIG. 18A, and FIG. 18B. In FIG. 14A, the spout module 122 of FIG. 18B may be in place of the spout module 22, where the system 311 is mounted on a receiving vehicle, unless the transferring vehicle has a rotation sensor for the spout and transmits the spout rotation angle to the system 311 for processing.

In FIG. 18B, an optional edge detector 105 and an optional linear Hough transformer 107 are shown in dashed lines. The optional edge detector 105 is coupled to the linear Hough transformer 107. In turn, the linear Hough transformer 107 is coupled to the spout localizer 125. The edge detector 105 and the linear Hough transformer 107 function as described above in conjunction with the container module 20 of FIG. 20, except that the processed image data relates to the position or coordinates of the spout 89 and the spout end 87, as opposed to the position of the storage container 93 or its container perimeter 81.

In one implementation, the edge detector 105, alone or in combination with the Hough transformer 107, detects an edge of the spout 89, or an edge the spout end 87. For example, the detection of the edge of a spout 89 in image data and its corresponding coordinates (e.g., in three dimensions) may provide an indication of the spout angle or rotation angle of the spout, or the orientation of the spout end 87 with respect to the transferring vehicle, or a reference point thereon. The spout module 122 of FIG. 18B can provide the spout angle, a position of the spout 89, or a position (e.g., three dimensional coordinates) of the spout end 87 without any sensor data from the rotation sensor 216 or the rotation sensor 266, although sensor data from any rotation sensor, tilt sensor or deflector sensor associated with the spout may be used to restrict the data for image processing within the collected image data to certain zones or quadrants of interest to more efficiently process the image data.

Figure 18C:
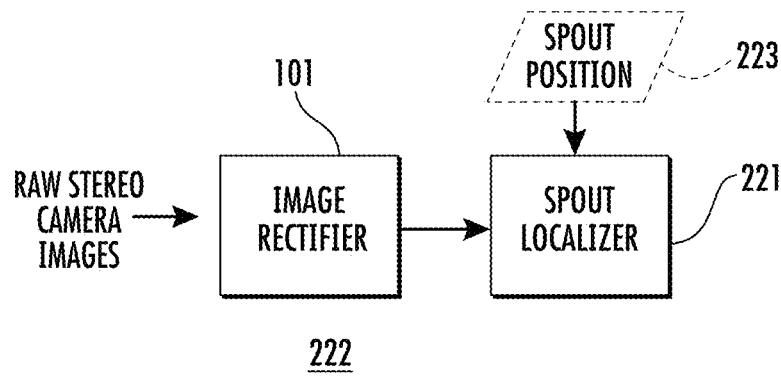
FIG. 18C is a block diagram of yet another example of a spout module or an image processing module.

FIG. 18C shows a block diagram that shows the logical flow of data for a spout module 222 that uses a spout angle sensor for detecting an angle of the spout with respect to the transferring vehicle for estimating a position of the spout end relative to the storage portion. In alternate implementations, the spout module 222 may be substituted for the spout module 22 in FIG. 12 through FIG. 14A, inclusive.

In FIG. 18C, the rotation sensor (116 or 266) is capable of communicating angle sensor data or a spout rotation angle with a first wireless communications device 48 on the transferring vehicle via a data bus. The first wireless communications device 48 transmits an electromagnetic signal that is modulated with the spout position input data to the second wireless communications device 148. The spout position input data comprises one or more of the following: angle sensor data, spout rotation angle, known spout length, spout tilt angle, and spout deflector status. The spout identification module 221 receives the spout position input data from the second wireless communications device 148 and rectified image data from the image rectification module 101.

In FIG. 18C, the rotation sensor 116 or 266 is arranged to sense a rotation angle of the spout on the transferring vehicle. The spout module (e.g., 22) or the system (1000, 1100, 1200 or 1300) may estimate a spout position based on the rotation angle and a known length of the spout 89. The known length of the spout may differ by manufacturer and model of the transferring vehicle. The known length of the spout can be: entered or selected by a user or operator into a user interface 44, programmed into the system (1000, 1100, 1200 or 1300), and/or even triggered by detection of an radio frequency identifier (RFID) tag on the transferring vehicle that is read by a RFID reader on the receiving vehicle.

The first wireless communications device 48 on the transferring vehicle is arranged for transmitting spout position input data or sensor data indicative of the sensed rotation angle of the spout. The second wireless communications device 148 on the receiving vehicle for receiving the spout position input data or sensor data indicative of the sensed rotation angle. In one implementation, spout module (e.g., 22) or spout identification module 221 estimates the spout position based on one or more of the following: (1) spout position input data or the sensor data and (2) a known length of the spout.

Figure 18D:
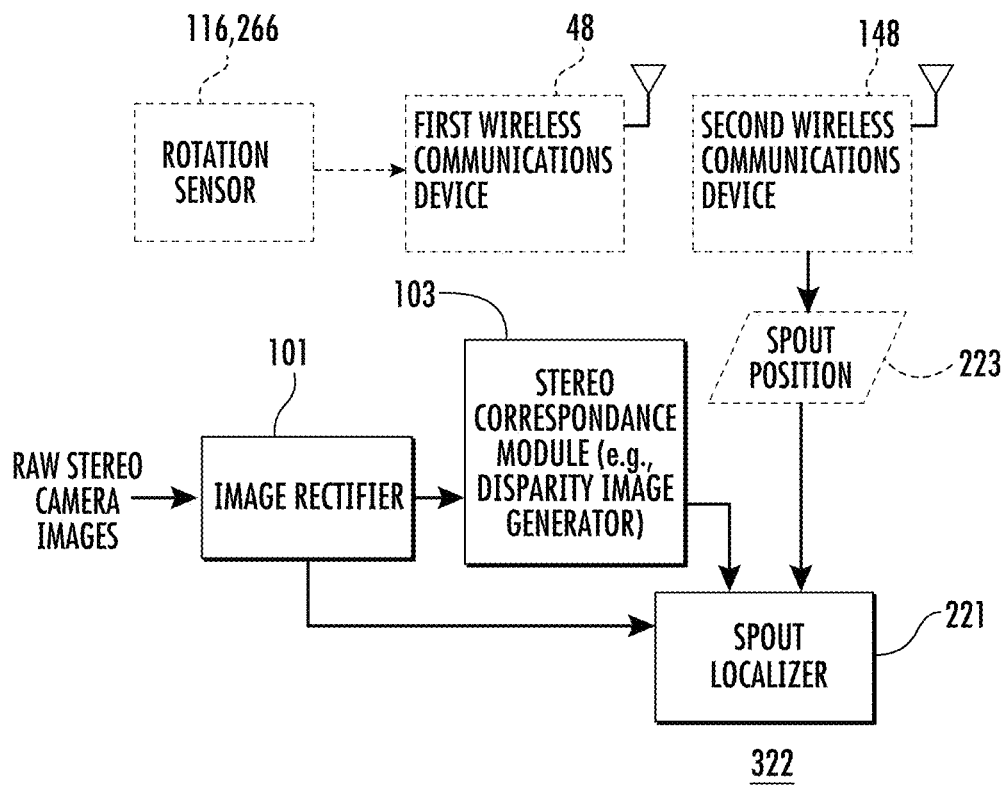
FIG. 18D is a block diagram of another example of a spout module or an image processing module.

The spout module 322 of FIG. 18D is similar to the spout module 222 FIG. 18C, except that the spout module 322 of FIG. 18D further includes the stereo correspondence module 103 (e.g., disparity image generator). Like reference numbers in FIG. 18C and FIG. 18D indicate like elements. In alternate implementations, the spout module 322 may be substituted for the spout module 222 in FIG. 12 through FIG. 14A, inclusive.

In the implementation of FIG. 18C, the spout module (e.g., 22) or spout identification module 221 estimates the spout position based on one or more of the following: (1) spout position input data or the sensor data, (2) a known length of the spout, and (3) processing of image data by the image data processing module 18 or the spout module 22 to supplement or complement the spout position that is derived from above items 1 and 2. For example, the unloading controller 1024 or spout module 22 may identify a spout end of the spout by processing a disparity image of the collected image data during one or more sampling periods. The spout identification module 221 may incorporate various detectors or image processors selected from the group consisting of a pattern identification detector, a color discrimination detector, and an edge detector. If a color or visual pattern is placed on or near the spout end to facilitate distinguishing spout data from background pixel data, the pattern identification detector, color discrimination detector or edge detector may be programmed or trained in a tailored manner to identify readily, quickly and efficiently the spout end or spout position. The unloading controller 1024 or the spout module 22 may determine the range of the pixels to the first imaging device 10 to estimate coordinates of a spout end 87 or spout position of the spout 89.

Systems 1100, 1200 and 1300,1400 each comprise a perception system similar to perception system 304 in the form of imaging devices 10, 12 and unloading controller 1024. Alignment module 24 and master/slave controller 59 function similarly to unloading controller 324 described above. In each of systems 1000, 1100, 1200, 1300 alignment module 24 and master/slave controller 59 are additionally operable in the model mode of operation described above. When in the model mode of operation, alignment module 24 and/or master/slave controller 59 determine a current fill state or characteristic (fill profile) of the container using the fill model 220 and/or generate control signals adjusting the ongoing MUR and/or MUL based upon fill model 220 as described above. When in the perception mode of operation, alignment module 24 and/or master/slave controller 59 operate as described with respect to system 11 above and set forth in U.S. Pat. No. 9,861,040 issued to Bonefas on Jan. 9, 2018. In doing so, alignment module 24 and master/slave controller 59 utilizes signals/images from imaging devices 10 and 12 and their analysis by unloading controller 1024 to determine the current fill state or fill profile of the container and to generate or adjust the ongoing MUR and/or MUL based upon fill model 220 as described above.

In addition to the associated functions described above, mode controller 1025 additionally carries out a performance evaluation with respect to imaging devices 10 and 12. As described above, the performance evaluation may evaluate the amount of dust, chaff or other debris, the existing lighting conditions and/or the degree to which the imaging devices are cameras are occluded or blocked. Based upon the evaluation, system 2000, 1100, 1200, 1300 may automatically switch between the perception mode of operation and the model mode of operation or may output a recommendation to an operator via user interface 44 for such a switch. The operator may then enter a command or other input via user interface 44 to initiate the switch.

Fill model update module 223 utilizes data obtained from imaging devices 10, 12 and the derived data provided by module 18 to continuously verify the accuracy of fill model 220. Unloading controller 324 may further compare the PBFS with respect to the corresponding MBFS to evaluate the accuracy of the existing or current MBFS. In circumstances where the MBFS is different or sufficiently different than the actual sensed PBFS identified by module 18, fill update module 223 may modify fill model 220 based upon the PBFS. As a result, the fill model 220 may be repeatedly, intermittently, or continuously updated based upon actual harvesting or gathering conditions.

Each of systems 1000, 1100, 1200 and 1300 may operate in either a perception mode of operation or a model mode of operation as described above. Each of such modified systems as well as system 2000 described above, when in the perception mode of operation, may operate in a fashion similar to the fashion described above and with respect to FIGS. 1-13 of U.S. Pat. No. 9,861,040 issued to Bonefas on Jan. 9, 2018.

U.S. Pat. No. 8,060,283 issued to Mott et al. on Nov. 15, 2011 describes an example of how the gathering/harvesting vehicle and the transport vehicle (tractor with pulled cart providing the container) may be coordinated or placed in synchronization. The relative positioning of the gathering/harvesting vehicle and the transport vehicle may be adjusted using such a system to adjust the MUL. Each of the above described systems and methods may incorporate the teachings of U.S. Pat. No. 8,060,283 issued to Mott et al. on Nov. 15, 2011. Each of the above described systems and methods may utilize the teachings of U.S. Pat. No. 8,060,283 to synchronize the gatherings as harvesting vehicle and the transport vehicle and to adjust the MUL.

U.S. Pat. No. 9,642,305 issued to Nykamp et al. on May 9, 2017, describes an example of how perception signals from a perception system may be used to determine a fill characteristic or fill state, such as a fill profile. U.S. Pat. No. 9,642,305 illustrates the example use of stereo cameras for capturing images, wherein perception signals representing the captured images are analyzed to determine a fill characteristic or fill state of the container, the cart. Each of the above described systems and methods may utilize the teachings of U.S. Pat. No. 9,642,305 when determining a fill character or fill state using perception signals from a perception system.

Each of the above systems and methods may be employed in any application where material is gathered/harvested and his subsequent unloaded into a container. In some implementations, the above systems and methods may be employed with grain harvesters, wherein grain is unloaded into a container. In some implementations, the above systems and methods may be employed in systems which gather soil, dirt, or rock, wherein the soil, dirt or rock is unloaded into a container of a transport vehicle. In yet other implementations, the above systems and methods may be employed with other gathering/harvesting vehicles and with other transport vehicles.

Although the present disclosure has been described with reference to example implementations, workers skilled in the art will recognize that changes may be made in form and detail without departing from disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

The invention claimed is:

1. A vehicle automated unloading system for unloading material, the unloading system comprising:
   a fill model of a fill characteristic of a container as a function of variables comprising material unloading times, material unloading rates and material unloading locations;
   a perception system configured to sense the container while being filled and to generate perception signals;
   an unloading controller to:
      determine a model-based estimate of the fill characteristic of the container based on the fill model independent of the perception signals;
      perform a performance evaluation of the perception system;
      when the perception system does not pass the performance evaluation, enter a model mode of operation; and
      when the perception system passes the performance evaluation, enter a perception mode of operation;
   wherein in the model mode of operation, the unloading controller is configured to output first control signals to adjust at least one of a material unloading state, a material unloading time, a material unloading rate and a material unloading location based upon the model-based estimate of the fill characteristic of the container; and
   wherein in the perception mode of operation, the unloading controller is configured to:
      determine a perception-based estimate of the fill characteristic of the container based on the perception signals; and
      output second control signals to adjust at least one of the material unloading time, the material unloading rate and the material unloading location based upon the perception-based estimate of the fill characteristic of the container.

2. The unloading system of claim 1, wherein the perception system comprises a sensor and wherein the performance evaluation of the perception system is based upon at least one of lighting conditions, airborne particulates and sensor occlusion.

3. The unloading system of claim 1, wherein the unloading controller, while in the perception mode of operation, is further configured to:
   compare the model-based estimate of the fill characteristic of the container with the perception-based estimate of the fill characteristic of the container; and
   adjust the fill model based upon the perception signals from the perception system when the model-based estimate of the fill characteristic differs from the perception-based estimate of the fill characteristic by more than a difference threshold.

4. The unloading system of claim 1, wherein the unloading controller switches between the model mode of operation and the perception mode of operation in response to operator input.

5. The unloading system of claim 4, wherein the unloading controller, while in the perception mode of operation, is to adjust the fill model based upon the perception signals from the perception system.

6. The unloading system of claim 1, wherein the container and an unloading vehicle from which the material is unloaded are both to be moving during unloading and wherein the first control signals and the second control signals are to adjust a relative location of the container and the unloading vehicle to adjust the material unloading location.

7. The unloading system of claim 1, wherein the unloading controller is to obtain prior unloading rates, prior unloading times and prior unloading locations, the model-based estimate of the fill characteristic being based upon the fill model, the prior unloading rates and the prior unloading locations.

8. The unloading system of claim 7, wherein the variables comprise a moisture of the material and a material type, wherein the unloading controller is to obtain prior moisture values and the material type, the model-based estimate of the fill characteristic being based upon the fill model, the prior unloading rates, the prior unloading locations, the prior moisture values and the material type.

9. An automated unloading method comprising:
obtaining a current fill state of a container being moved proximate a moving unloading vehicle;
consulting a fill model of a fill characteristic of the container as a function of variables comprising material unloading times, material unloading rates and material unloading locations;
receiving perception signals from a perception system configured to sense the container while being filled;
determining a model-based estimate of the fill characteristic of the container using the fill model independent of the perception signals;
evaluating performance of the perception system;
entering a model mode of operation when the perception system does not pass the performance evaluation;
entering a perception mode of operation when the perception system passes the performance evaluation;
in the model mode of operation, adjusting at least one of a material unloading rate and a material unloading location based upon the model-based estimate of the fill characteristic of the container; and
in the perception mode of operation, determining a perception-based estimate of the fill characteristic of the container using the perception signals, and adjusting at least one of the material unloading rate and the material unloading location based upon the perception-based estimate of the fill characteristic of the container.

10. The method of claim 9, wherein the perception system comprises a sensor and wherein the evaluating performance of the perception system is based upon at least one of lighting conditions, airborne particulates and sensor occlusion.

11. The method of claim 9, further comprising adjusting the fill model based upon perception signals from the perception system while in the perception mode of operation.

12. The method of claim 9, wherein the adjusting comprises adjusting the material unloading location by adjusting a relative location of the container and the unloading vehicle.

13. The method of claim 9, wherein the variables of the fill model comprise a moisture of the material and a material type, the method further comprising obtaining a moisture value and a material type for the material being unloaded.

14. A vehicle automated unloading system comprising:
an unloading vehicle;
a perception system carried by the unloading vehicle for use during a perception mode of operation, the perception system to sense a container carried by a receiving vehicle during filling of the container with material from the unloading vehicle and to generate perception signals;
a fill model of a fill characteristic of the container as a function of variables comprising material unloading times, material unloading rates and material unloading locations, the fill model for use during a model mode of operation; and
an unloading controller to:
carry out a performance evaluation of the perception system;
switch between the perception mode of operation and the model mode of operation based upon the performance evaluation;
in the perception mode of operation, determine a perception-based estimate of the fill characteristic of the container based on the perception signals, and generate control signals to adjust at least one of a material unloading time, a material unloading rate and a material unloading location based upon the perception-based estimate of the fill characteristic of the container; and
in the model mode of operation, determine a model-based estimate of the fill characteristic of the container based on the fill model independent of the perception signals, and generate control signals to adjust at least one of the material unloading time, the material unloading rate and the material unloading location based upon the model-based estimate of the fill characteristic of the container.

15. The unloading system of claim 14, wherein the variables comprise a moisture and type of material being unloaded.

16. The unloading system of claim 14, wherein the perception system comprises a sensor and wherein the evaluating of the performance of the perception system is based upon at least one of lighting conditions, airborne particulates and sensor occlusion.

17. The unloading system of claim 14 further comprising adjusting the fill model based upon the perception signals from the perception system while in the perception mode of operation.

18. The method of claim 9, further comprising in the perception mode of operation:
comparing the model-based estimate and the perception-based estimate of the fill characteristic of the container; and
when the model-based estimate differs from the perception-based estimate by more than a difference threshold, adjusting the fill model based upon the perception signals from the perception system.

19. The unloading system of claim 14, in the perception mode of operation the unloading controller is further configured to:
compare the model-based estimate and the perception-based estimate of the fill characteristic of the container; and
when the model-based estimate differs from the perception-based estimate by more than a difference threshold, adjust the fill model based upon the perception signals from the perception system.

* * * * *